United States Patent
Zhang et al.

(10) Patent No.: US 11,158,089 B2
(45) Date of Patent: Oct. 26, 2021

(54) CAMERA PARAMETER CALIBRATION METHOD, DEVICE, APPARATUS, AND SYSTEM

(71) Applicant: HANGZHOU HIKVISION DIGITAL TECHNOLOGY CO., LTD., Hangzhou (CN)

(72) Inventors: Kui Zhang, Hangzhou (CN); Xunlong Xia, Hangzhou (CN); Hui Mao, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 29 days.

(21) Appl. No.: 16/627,621

(22) PCT Filed: Jun. 26, 2018

(86) PCT No.: PCT/CN2018/092808
§ 371 (c)(1),
(2) Date: Dec. 30, 2019

(87) PCT Pub. No.: WO2019/001410
PCT Pub. Date: Jan. 3, 2019

(65) Prior Publication Data
US 2020/0151908 A1 May 14, 2020

(30) Foreign Application Priority Data
Jun. 30, 2017 (CN) .......................... 201710522139.6

(51) Int. Cl.
*G06K 9/00* (2006.01)
*G06T 7/80* (2017.01)
*G06K 9/62* (2006.01)

(52) U.S. Cl.
CPC .............. *G06T 7/85* (2017.01); *G06K 9/6201* (2013.01); *G06T 2207/10012* (2013.01); *G06T 2207/30208* (2013.01)

(58) Field of Classification Search
CPC combination set(s) only.
See application file for complete search history.

(56) References Cited

U.S. PATENT DOCUMENTS 8,368,762 B1 * 2/2013 Chen .................... H04N 17/002
348/188
8,619,144 B1 * 12/2013 Chang ..................... G06T 7/80
348/187
(Continued)

FOREIGN PATENT DOCUMENTS

| CN | 102930544 | 2/2013 |
|---|---|---|
| CN | 105096317 | 11/2015 |

(Continued)

OTHER PUBLICATIONS

International Search Report and Written Opinion issued in Corresponding International Patent Application No. PCT/CN2018/092808, dated Sep. 27, 2018 (English Translation of ISR).
(Continued)

*Primary Examiner* — Shervin K Nakhjavan
(74) *Attorney, Agent, or Firm* — Norton Rose Fulbright US LLP

(57) ABSTRACT

Embodiments of the present application provide a method, apparatus, device and system for calibrating parameters of a camera. In this solution, a camera performs image capturing on multiple checkerboard targets to obtain a calibration image, in other words, the calibration image contains multiple checkerboards, and the camera parameters are solved based on the calibration image containing the multiple checkerboards. In a first aspect, the calibration image contains multiple checkerboards, so that it is not necessary to
(Continued)

adjust the position or posture of a checkerboard target for multiple times and to capture a calibration image with respect to the checkerboard target for multiple times, thereby improving the calibration efficiency. In a second aspect, the fact of capturing a calibration image with respect to the checkerboard target for multiple times results in a relatively large error for capturing, while this error for capturing is reduced by applying this solution.

17 Claims, 5 Drawing Sheets

(56) References Cited

U.S. PATENT DOCUMENTS

| | | | | |
|---|---|---|---|---|
| 8,866,912 B2* | 10/2014 | Mullis | .................... | H04N 17/02 |
| | | | | 348/187 |
| 2004/0104935 A1* | 6/2004 | Williamson | ............ | G06T 15/20 |
| | | | | 715/757 |
| 2004/0217260 A1* | 11/2004 | Bernardini | ................ | G01J 1/08 |
| | | | | 250/208.1 |
| 2009/0290787 A1* | 11/2009 | Stevens | .................... | G06T 7/593 |
| | | | | 382/154 |
| 2010/0134688 A1* | 6/2010 | Moriwake | ................. | G06T 7/80 |
| | | | | 348/586 |
| 2012/0287240 A1* | 11/2012 | Grossmann | ............... | G06T 7/80 |
| | | | | 348/46 |
| 2013/0010081 A1* | 1/2013 | Tenney | .............. | G05B 19/4086 |
| | | | | 348/47 |
| 2013/0259403 A1* | 10/2013 | Osinusi | ................ | G06K 9/3208 |
| | | | | 382/294 |
| 2014/0078260 A1* | 3/2014 | Taubin | ...................... | G06T 7/80 |
| | | | | 348/46 |
| 2016/0316198 A1 | 10/2016 | Benmoshe et al. | | |
| 2019/0295291 A1* | 9/2019 | Raag | ........................ | G06T 7/70 |

FOREIGN PATENT DOCUMENTS

| | | |
|---|---|---|
| CN | 105488810 | 4/2016 |
| CN | 106846415 | 6/2017 |
| EP | 3070675 | 9/2016 |

OTHER PUBLICATIONS

Office Action issued in Corresponding Chinese Application No. 201710522139.6, dated Mar. 20, 2020, 10 pages (English translation unavailable).

Extended European Search Report issued in Corresponding European Application No. 18825102.9, dated May 19, 2020.

Geiger et al., "Automatic camera and range sensor calibration using a single shot." 2012 IEEE International Conference on Robotics and Automation, May 1, 2012, 8 pages.

* cited by examiner

CAMERA PARAMETER CALIBRATION METHOD, DEVICE, APPARATUS, AND SYSTEM

CROSS-REFERENCE TO RELATED APPLICATIONS

The present application is a national phase under 35 U.S.C. § 371 of International Application No. PCT/CN2018/092808, filed Jun. 26, 2018, which claims the priority to a Chinese patent application No. 201710522139.6 filed with the China National Intellectual Property Administration on Jun. 30, 2017 and entitled "Camera Parameter Calibration Method, Device, Apparatus and System", the entire contents of each of which are incorporated herein by reference in their entirety.

TECHNICAL FIELD

The present application relates to the field of camera calibration technologies, and in particular to a method, apparatus, device and system for calibrating parameters of a camera.

BACKGROUND

In the image measurement process and machine vision application, in order to determine a corresponding relationship between a three-dimensional geometric position of a point on a surface of a space object and a pixel in an image, it is usually required to establish a geometric model for camera imaging, these parameters of the geometric model are parameters of the camera, and the process of solving the parameters of the camera is called camera calibration.

In existing camera calibration algorithms, it is usually required to adjust the position or posture of a checkerboard target for multiple times. After each position adjustment, an image of the checkerboard target is acquired, and multiple images of the checkerboard target at different positions or different postures are obtained. The camera parameters are solved based on the multiple images.

When applying the above solution, it is required to adjust the position or posture of the checkerboard target for multiple times, and to capture an image of the checkerboard target for multiple times, which results in low efficiency.

SUMMARY OF THE INVENTION

An objective of the present application is to provide a method, apparatus and system for calibrating parameters of a camera, to improve the calibration efficiency.

To achieve the above objective, embodiments of the present application provide a method for calibrating parameters of a camera, including:

obtaining a calibration image for multiple checkerboard targets captured by a camera to be calibrated;

determining, in the calibration image, first checkerboard corners;

generating multiple checkerboards according to the determined first checkerboard corners;

converting each of the multiple checkerboards to a respective checkerboard world coordinate system to obtain second checkerboard corners of each checkerboard;

calculating the parameters of the camera to be calibrated according to a projection relationship between the second checkerboard corners and the first checkerboard corners.

To achieve the above objective, embodiments of the present application further provide an apparatus for calibrating parameters of a camera, including:

a first obtaining module, configured to obtain a calibration image for multiple checkerboard targets captured by a camera to be calibrated;

a first determining module, configured to determine, in the calibration image, first checkerboard corners;

a generating module, configured to generate multiple checkerboards according to the determined first checkerboard corners;

a conversion module, configured to convert each of the multiple checkerboards to a respective checkerboard world coordinate system to obtain second checkerboard corners of each checkerboard;

a first calculating module, configured to calculate the parameters of the camera to be calibrated according to a projection relationship between the second checkerboard corners and the first checkerboard corners.

To achieve the above objective, embodiments of the present application further provide an electronic device, including a processor and a memory, wherein the memory is configured to store a computer program;

the processor is configured to implement any of the above methods for calibrating parameters of a camera when executing the program stored in the memory.

To achieve the above objective, embodiments of the present application further provide a computer readable storage medium, wherein the computer readable storage medium stores a computer program, and the computer program implements any of the above methods for calibrating parameters of a camera when being executed by a processor.

To achieve the above objective, embodiments of the present application further provide a system for calibrating a camera, including: a camera to be calibrated and a processing device; wherein, the camera to be calibrated is configured to perform image capturing on multiple checkerboard targets to obtain a calibration image;

the processing device is configured to obtain the calibration image for the multiple checkerboard targets captured by the camera to be calibrated; determine, in the calibration image, first checkerboard corners; generate multiple checkerboards according to the determined first checkerboard corners; convert each of the multiple checkerboards to a respective checkerboard world coordinate system to obtain second checkerboard corners of each checkerboard; calculate the parameters of the camera to be calibrated according to a projection relationship between the second checkerboard corners and the first checkerboard corners.

To achieve the above objective, embodiments of the present application further provide executable program code, wherein the executable program code implement any of the above methods for calibrating parameters of a camera when being executed.

Applying the embodiments in the present application, a camera performs image capturing on multiple checkerboard targets to obtain a calibration image, in other words, the calibration image contains multiple checkerboards, based on the calibration image containing the multiple checkerboards, the camera parameters are solved, and it does not need to adjust the position or posture of a checkerboard target for multiple times, and does not need to capture an image of the checkerboard target for multiple times, thereby improving the calibration efficiency.

Of course, implementing any of the products or methods of the present application does not necessarily require achieving all of the advantages described above at the same time.

BRIEF DESCRIPTION OF THE DRAWINGS

In order to illustrate the technical solutions of the embodiments of the present application and the related art more clearly, the drawings used in the embodiments and the related art will be briefly described below. It is apparent that the drawings in the following description are only for some embodiments of the present application, other drawings can be obtained by those of ordinary skill in the art without any creative effort based on these drawings.

DETAILED DESCRIPTION OF THE INVENTION

In order to make the objectives, technical solutions and the advantages of the present application more clear, the present application will be described in details below with reference to the accompanying drawings and by way of embodiments. It is obvious that the described embodiments are only a part of the embodiments of the present application, but not all of them. All other embodiments obtained by a person of ordinary skill in the art based on the embodiments of the present application without any creative effort fall within the protection scope of the present application.

In order to solve the above technical problem, embodiments of the present application provide a method, apparatus, device and system for calibrating parameters of a camera. The following is a description of a method for calibrating parameters of a camera, which can be applicable to a camera to be calibrated, and can also be applicable to other electronic devices that are connected to the camera to be calibrated, which is not specifically limited herein. The camera to be calibrated may be a monocular camera, a binocular camera, or a multi-ocular camera, and may also be a pinhole camera or a fisheye camera, or the like, which is not specifically limited herein.

Figure 1:
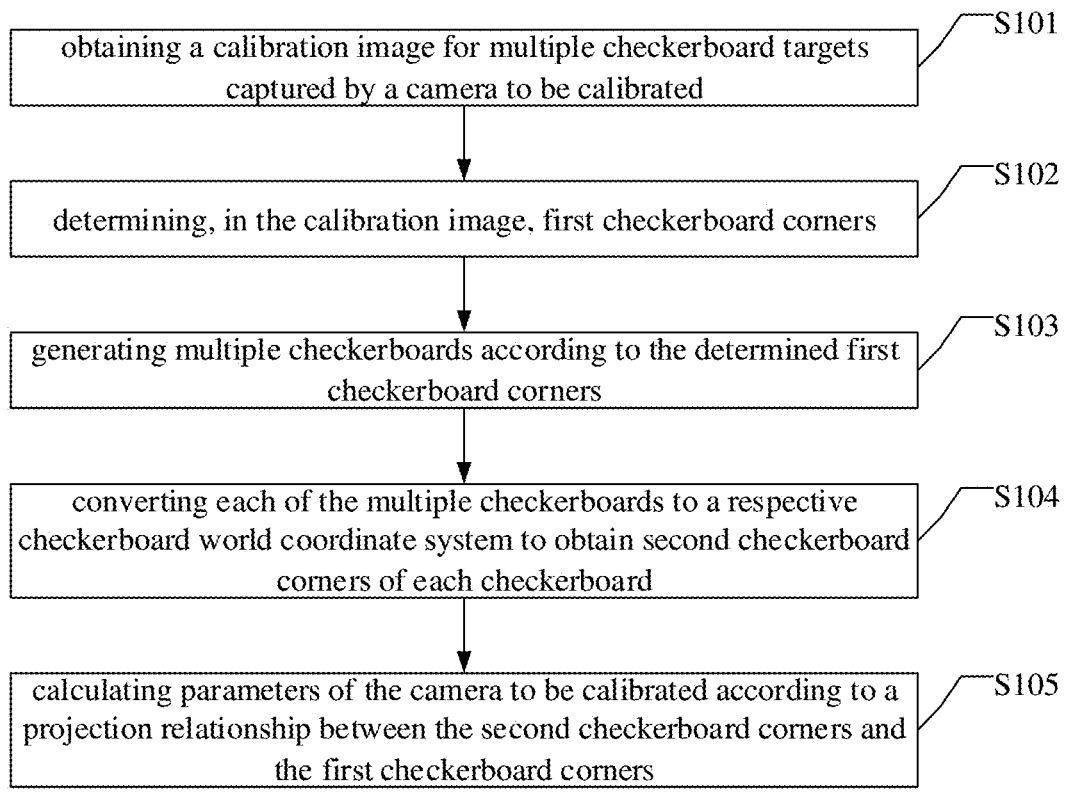
FIG. 1 is a schematic flowchart of a first method for calibrating parameters of a camera according to an embodiment of the present application.

FIG. 1 is a schematic flowchart of a first method for calibrating parameters of a camera provided by an embodiment of the present application, including:

S101: obtaining a calibration image for multiple checkerboard targets captured by a camera to be calibrated;

S102: determining, in the calibration image, first checkerboard corners;

S103: generating multiple checkerboards according to the determined first checkerboard corners;

S104: converting each of the multiple checkerboards to a respective checkerboard world coordinate system to obtain second checkerboard corners of each checkerboard;

S105: calculating the parameters of the camera to be calibrated according to a projection relationship between the second checkerboard corners and the first checkerboard corners.

When applying the embodiment shown in FIG. 1 of the present application, the camera performs image capturing on multiple checkerboard targets to obtain a calibration image, in other words, the calibration image contains multiple checkerboards, and the camera parameters are solved based on the calibration image containing the multiple checkerboards. In a first aspect, the calibration image contains multiple checkerboards, so that it is not necessary to adjust the position or posture of a checkerboard target for multiple times and capture a calibration image with respect to the checkerboard target for multiple times, thereby improving the calibration efficiency. In a second aspect, the fact of capturing a calibration image with respect to the checkerboard target for multiple times results in a relatively large error for capturing, while this error for capturing is reduced by applying this solution.

The embodiment shown in FIG. 1 will be described in detail below.

S101: obtaining a calibration image for multiple checkerboard targets captured by a camera to be calibrated.

If the embodiment is executed by the camera to be calibrated, the camera can perform image capturing on multiple checkerboard targets to obtain a calibration image. If the embodiment is executed by another electronic device having a processing function, the device can receive the calibration image sent by the camera to be calibrated, and the calibration image is obtained by the camera to be calibrated by performing image capturing on multiple checkerboard targets.

In the embodiment of the present application, multiple checkerboard targets are preset, and the postures and positions of the multiple checkerboard targets are different. Optionally, for each of the multiple checkerboard targets, the angle between a plane in which the checkerboard target is located and a corresponding imaging plane is between 30 degrees to 45 degrees, and the planes in which the respective checkerboard targets are located are not parallel to each other.

In order to distinguish the description, in this embodiment, the checkerboard in the real world is called a checkerboard target, and the checkerboard in an image is called a checkerboard.

S102: determining, in the calibration image, first checkerboard corners.

Figure 2:
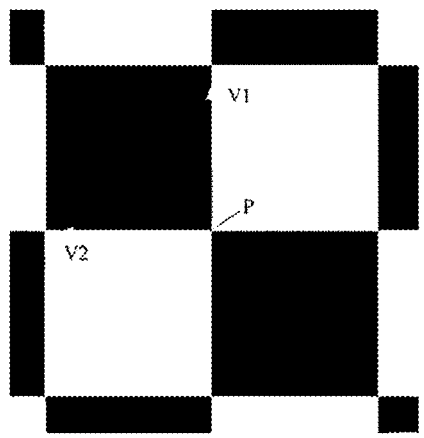
FIG. 2 is a schematic diagram showing checkerboard corners according to an embodiment of the present application.

A checkerboard corner can be understood as an intersection point between a black checkerboard and a white checkerboard, such as the point P in FIG. 2. The checkerboard corner has some unique features of the corners. With these features, the checkerboard corners can be identified in the pixels of the calibration image.

In the present embodiment, for convenience of description, the checkerboard corners in the pixels of the calibration image are referred to as first checkerboard corners.

As an implementation, S102 may include:
filtering the calibration image by using a preset image filtering template;
calculating a corner likelihood of each pixel in the calibration image according to a filtering result;
determining the first checkerboard corners in the calibration image based on a corner likelihood of each pixel.

Figure 3:
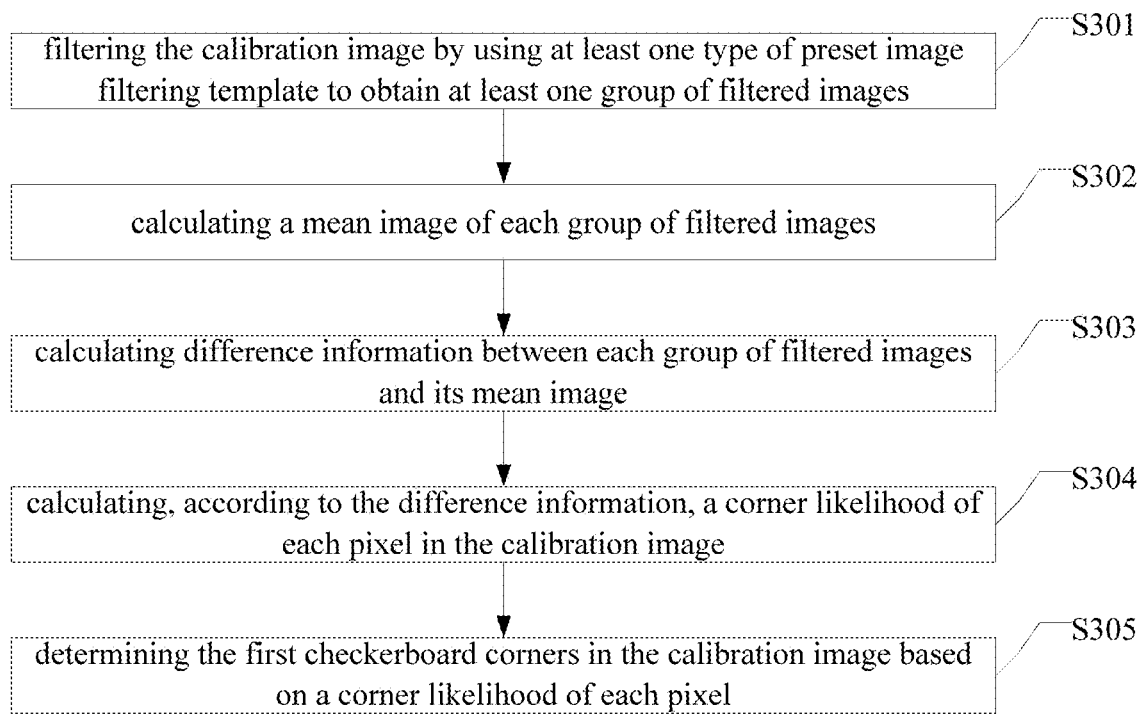
FIG. 3 is a schematic flowchart of determining a checkerboard corner according to an embodiment of the present application.

In this embodiment, the specific process of determining the first checkerboard corners can be as shown in FIG. 3, including:

S301: filtering the calibration image by using at least one type of preset image filtering template to obtain at least one group of filtered images, wherein each type of image filtering template includes multiple image filtering templates, each type of image filtering template corresponds to a group of filtered images, and each type of image filtering template is set with respect to a feature of checkerboard corners;

S302: calculating a mean image of each group of filtered images;

S303: calculating difference information between each group of filtered images and its mean image;

S304: calculating, according to the difference information, a corner likelihood of each pixel in the calibration image;

S305: determining the first checkerboard corners in the calibration image based on a corner likelihood of each pixel.

Figure 4:
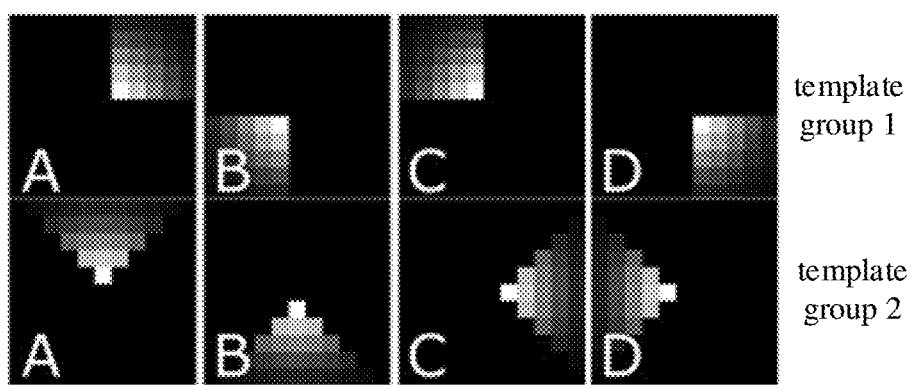
FIG. 4 is a schematic diagram of an image filtering template according to an embodiment of the present application.

In the present embodiment, an image filtering template can be set with respect to a feature of checkerboard corners. For example, as shown in FIG. 4, two types of image filtering template (template group 1 and template group 2) can be preset, and each type of image filtering template includes four image filtering templates. It can be understood by those skilled in the art that the first type of image filtering template (template group 1) can detect an axisymmetric corner, and the second type of image filtering template (template group 2) can detect a corner rotated by 45 degrees with respect to the horizontal direction (or the vertical direction).

The calibration image obtained in S101 is captured with respect to multiple checkerboard targets with different positions and postures, and the checkerboard targets may be in an inclined position, so that a checkerboard in the calibration image is no longer an axisymmetric figure. Therefore, these checkerboards that are no longer axisymmetric can be detected with the above second type of image filtering template.

The image filtering templates shown in FIG. 4 are only illustrative and do not constitute any limitation. For example, A and B in the template group 1 may be combined into one template, and C and D into one template. In other words, the first type of image filtering template may contain two image filtering templates, so that axisymmetric corners can also be detected.

FIG. 4 is taken as an example for illustration.
Assuming a mean image is $I_{uf}$, $$I_{uf} = \frac{(f_A^i + f_B^i + f_C^i + f_D^i)}{4},$$

wherein $f_A^i$ is an image obtained after being filtered by template A in the i-th type of template, $f_B^i$ is an image obtained after being filtered by template B in the i-th type of template, and $f_C^i$ is an image obtained after being filtered by template C in the i-th type of template, $f_D^i$ is an image obtained after being filtered by template D in the i-th type of template, i is 1 or 2.

In this embodiment, the multiple images obtained by being filtered using one type of image filtering template are referred to as a group of filtered images, that is, $f_A^1, f_B^1, f_C^1,$ and $f_D^1$ are one group of filtered images, $f_A^2, f_B^2, f_C^2,$ and $f_D^2$ are also a group of filtered images.

When calculating the difference information between each group of filtered images and its mean image, an image with a smaller average pixel value in the group is first determined, and then the determined image is compared with the mean image of the group to obtain the difference information. It is assumed that the difference information includes $I^1_{c_1}$ and $I^i_{c_2}$, wherein the $I^i_{c_1}$ and $I^i_{c_2}$ represent the response information of each pixel in the calibration image to the i-th type of template, $$I^i_{c_1} = \min\{\min(f^i_A, f^i_B) - I_{uf}, I_{uf} - \min(f^i_C, f^i_D)\};$$

$$I^i_{c_2} = \min\{(I^{uf} - \min(f^i_A, f^i_B), \min(f^i_C, f^i_D) - I_{uf}\}.$$

Assuming the corner likelihood of the pixels in the calibration image is $I_C$, $$I_c = \max(I^1_{c_1}, I^1_{c_2}, I^2_{c_1}, I^2_{c_2}).$$

The corner likelihood can be understood as the probability that a pixel is a corner. Based on the pixel value of each pixel, the first checkerboard corners in the calibration image can be determined.

For example, a pixel with great corner likelihood can be extracted from the $I_C$ as a first checkerboard corner by a non-maximum suppression algorithm. Specifically, a local maximum point can be determined in the $I_C$, and the likelihood of the points other than the local maximum point is set to zero.

Alternatively, pixels with greater corner likelihood may be extracted from the $I_C$ as candidate pixels, and then a first checkerboard corner may be further selected from the candidate pixels. Specifically, for each candidate pixel, a gradient score and/or a brightness score of the candidate pixel may be calculated; wherein the gradient score indicates the similarity between the gray variation direction of the candidate pixel and the gray variation direction of the checkerboard corner; and the brightness score indicates the similarity between the gray value of the candidate pixel and the gray value of the checkerboard corner. Based on the gradient scores and/or the brightness scores, the first checkerboard corners are selected from the candidate pixels.

For example, one or more n*n templates $T_g$ may be constructed in advance according to edge directions of a corner, wherein the edge directions of a corner are V1 and V2 directions shown in FIG. 2. The value of the edge direction in $T_g$ is 1, the values of other directions are 0. The dot product of the gradient magnitude of the corner in the template $T_g$ and the gradient magnitude of the candidate pixel in the n*n neighborhood can be used as the gradient score of the candidate pixel.

One or more n*n filter templates f may be constructed in advance according to edge directions of a corner, and the dot product of the pixel value of the corner in the template f and the pixel value of the candidate pixel in the n*n neighborhood may be used as the brightness score of the candidate pixel.

A threshold may be set for the product of the gradient score and the brightness score, and if the product of the gradient score and the brightness score of a candidate pixel is greater than the threshold, the candidate pixel is taken as the first checkerboard corner.

As an implementation, the threshold set for the product of the gradient score and the brightness score may be 0.02.

As an implementation, before calculating the gradient score and/or the brightness score of a candidate pixel, optimization processing may be performed on the candidate pixel, and then the gradient score and/or the brightness score of the optimized candidate pixel may be calculated.

The optimization process may include: determining two directions with largest gradient magnitudes in the neighborhood of the candidate pixel as the edge directions of the candidate pixel; and optimizing the edge directions and position of the candidate pixel.

As shown in FIG. 2, for the corner P, the two directions in which the gradient amplitude is the largest are directions V1 and V2, and then the directions V1 and V2 are the edge directions of the point P.

For example, for each candidate pixel in the calibration image, the horizontal gradient $d_u$ and the vertical gradient $d_v$ of the pixel may be extracted based on the Sobel edge detection algorithm, and the gradient magnitude is mag=$\sqrt{d_u^2+d_v^2}$, the gradient direction is $$ang = \tan^{-1}\left(\frac{d_v}{d_u}\right).$$

For example, $2\pi$ can be divided into 32 parts, that is, the direction of 1/32 circle is taken for calculation. For a certain candidate pixel, a gradient amplitude histogram in the 21*21 neighborhood of the candidate pixel can be obtained by statistics. The two angular directions corresponding to the two greatest values in the histogram are the edge directions of the candidate pixel.

In addition, the candidate pixels may be further filtered based on the angular directions. For example, the candidate pixels with $\cos(v_1, v_2) \geq 0.25$ are deleted, thus the number of candidate pixels is reduced, and the subsequent calculation amount is reduced.

The edge direction can be optimized using the following formula:

$$v_i^{new} = \min_{v_i} \Sigma_{q \in N_p}(g^T_q v_i)^2, \text{the constraint term is}$$
$$v_i^T v_i = 1;$$

wherein p is a pixel, $v_i^{new}$ is the edge direction after the pixel p is optimized, $v_i$ is the edge direction before the pixel p is optimized, and g is the gradient of the pixel p, $g=(d_u, d_v)^T$, $N_p$ is a point that satisfies both $$\left|v_i\left(\frac{g_q}{norm(g_q)}\right)\right| < \tau_1$$

and $norm(g_q) > \tau_2$ in the n*n neighborhood of the pixel p, $$\left|v_i\left(\frac{g_q}{norm(g_q)}\right)\right|$$

can be understood as the cosine of $v_i$ and g, and $g_q$ represents the gradient vector $(d_u, d_v)$ of a pixel q in Np. That is, the optimum direction of the pixel p is determined by minimizing the sum of the gradient directions of all target points in the neighborhood and the sum of cosine values in the edge direction of the current corner. The target point satisfies two conditions at the same time: 1. the angle between the gradient direction of the target point and the edge direction of the pixel is greater than $\cos^{-1} \tau_1$; 2. the gradient magnitude of the target point is greater than $\tau_2$. As an embodiment, $\tau_1=0.25$, $\tau_2=0.1$.

The position of a pixel can be optimized in a sub-pixel optimized manner. Specifically, first, a pixel q that satisfies $$\left|v_i\left(\frac{g_q}{norm(g_q)}\right)\right| < \tau_1$$

is selected within the n*n neighborhood of the pixel p. The gradient vector $g_q$ of the point q is approximately orthogonal to p-q. The objective function for optimization may be:

$$P_{new} = \min_p \Sigma_{q \in N_p} \{g^T_q(q-p)\}^2, p_{new} \text{ is the pixel p after position optimization.}$$

S103: generating multiple checkerboards according to the determined first checkerboard corners.

After determining the checkerboard corners (first checkerboard corners) in the calibration image in S102, checkerboard growth may be performed based on the checkerboard corners, thereby obtaining multiple checkerboards.

Figure 5:
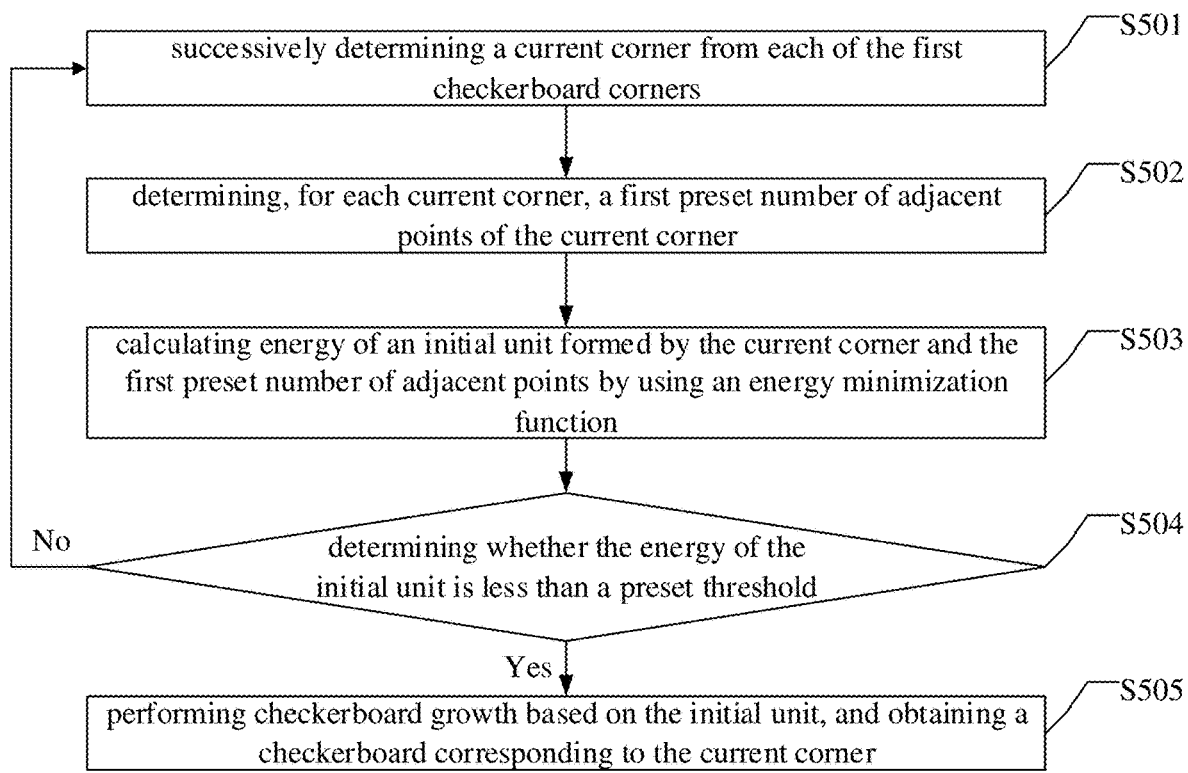
FIG. 5 is a schematic flowchart of generating a checkerboard according to an embodiment of the present application.

As an implementation, the specific process of S103 may be as shown in FIG. 5, including:

S501: successively determining a current corner from each of the first checkerboard corners;

S502: determining, for each current corner, a first preset number of adjacent points of the current corner, wherein the first preset number of adjacent points belong to the first checkerboard corners;

S503: calculating energy of an initial unit formed by the current corner and the first preset number of adjacent points by using an energy minimization function.

S504: determining whether the energy of the initial unit is less than a preset threshold; if not, returning to execute S501; if yes, executing S505.

S505: performing checkerboard growth based on the initial unit, and obtaining a checkerboard corresponding to the current corner.

Each of the first checkerboard corners can be traversed. In other words, each of the first checkerboard corners can be used as the current corner successively.

For example, the first preset number may be 8, and 8 adjacent points of the current corner may be determined according to the edge directions of the current corner, and the 8 adjacent points all belong to the first checkerboard corners determined in S102. In other words, the initial unit can be a 3*3 checkerboard. Alternatively, the initial unit may also be a checkerboard (n*n) of other specifications, and the first preset number is n*n−1.

The energy of an initial unit formed by the current corner and the first preset number of adjacent points is calculated by using an energy minimization function, and the purpose of the growth of the checkerboard is to make the energy of the checkerboard minimum, and the energy E of the checkerboard is defined as follows:

$E=E_{corners}+E_{struct}$, wherein $E_{corners}=-W \times H$, W and H are the length and width of the checkerboard respectively, $$E_{struct} = W \times H \times \max_{i \in C} \frac{\|c_{i-1} - 2c_i + c_{i+1}\|}{\|c_{i-1} - c_{i+1}\|}, \frac{\|c_{i-1} - 2c_i + c_{i+1}\|}{\|c_{i-1} - c_{i+1}\|}$$

indicates the state (good or bad) of the corner $c_{i+1}$ predicted through the corners $c_{i-1}$ and $c_i$, and C is all corners of the checkerboard, W×H is the weight.

The initial unit also belongs to the checkerboard, and the energy of the initial unit can also be calculated using the above formula. For the energy minimization function, a maximum value (the preset threshold) may be set, for example, the maximum value can be zero. If the calculated energy of the initial unit is greater than or equal to 0, then the determination result of S504 is no, and then returning to S501-S504. In other words, a current corner is determined again, and a new initial unit is formed based on the new current corner until the energy of the initial unit is less than the preset threshold.

After the energy of the initial unit is less than the preset threshold, the checkerboard growth is performed based on the initial unit, to obtain a checkerboard corresponding to the current corner. Specifically, for each of four growth directions of the initial unit, a candidate corner in the direction may be determined; a second preset number of adjacent points of the candidate corner is determined; and the energy of a growth unit formed by the candidate corner and the second preset number of adjacent points is calculated; a growth unit having the minimum energy is selected as a growth result; whether the energy of the growth result is greater than the energy of the initial unit is determined; if yes, the growth in this direction is stopped; if not, the growth is continued based on the growth result.

The initial unit also belongs to the checkerboard. There are four growth directions, and candidate corners may be determined in each direction. For example, for an initial unit of 3*3, there are four corners in each growth direction and marked as 1, 2, 3, and 4 successively when being observed from the growth direction. Then the points 2, 3 and 4 may be used as candidate corners. Based on the three candidate corners, a second preset number of adjacent points of each candidate corner are determined, and the second preset number of adjacent points also belong to the first checkerboard corners determined in S102.

Each candidate corner and its corresponding second preset number of adjacent points constitute a new checkerboard unit, referred to herein as a growth unit. The energy of the growth unit is calculated. Specifically, the energy of the growth unit can be calculated by using the above formula $E = E_{corners} + E_{struct}$.

During the growth process, E should be minimized. Therefore, if the energy of the growth unit is less than the energy of the initial unit, the growth result is accepted, and the growth is continued based on the growth result. Otherwise, the growth is stopped in this direction.

It can be understood that the growth continued based on the growth result is similar to the growth based on the initial unit, and the growth result is referred to as a growth unit:

for each of the four growth directions of the growth unit, a candidate corner in this direction is determined; a second preset number of adjacent points of the candidate corner is determined, and the second preset number of adjacent points belong to the first checkerboard corners; and the energy of a new growth unit formed by the candidate corner and the second preset number of adjacent points is calculated; a growth unit having the minimum energy is selected as a growth result; whether the energy of the growth result is greater than the energy of the growth unit (that is the energy of the checkerboard before growth) is determined; if yes, the growth is stopped in this direction; if not, growth is continued based on the growth result.

The above process repeats until the growth is stopped in all directions.

As an implementation, in the growth process, a checkerboard obtained by growth may be stored in a checkerboard sequence. After obtaining a checkerboard corresponding to the current corner, it is determined whether the checkerboard sequence is empty; if yes, the checkerboard corresponding to the current corner is added to the checkerboard sequence; if not, it is determined whether the checkerboard corresponding to the current corner and the checkerboard in the checkerboard sequence have an overlapping corner. If no such overlapping corner is present, the checkerboard corresponding to the current corner is added to the checkerboard sequence. If such overlapping corner is present, a target checkerboard in the checkerboard sequence in which the overlapping corner is located is determined. It is determined whether the energy of the checkerboard corresponding to the current corner is less than the energy of the target checkerboard; if yes, in the checkerboard sequence, the target checkerboard is replaced with the checkerboard corresponding to the current corner.

For example, assuming that a checkerboard X is obtained by the growth (first growth) based on the first current corner, at this point, the checkerboard sequence is empty, X is added to the checkerboard sequence. A checkerboard Y is obtained by the growth (second growth) based on the second current corner, at this point, the checkerboard sequence is not empty, and it is determined whether there is an overlapping corner between Y and X in the checkerboard sequence. If there is no overlapping corner, Y is added to the checkerboard sequence, and the checkerboard sequence contains only X and Y. If there is an overlapping corner, it is determined whether the energy of Y is less than the energy of X, if yes, X in the checkerboard sequence is replaced with Y, that is, the checkerboard sequence only contains Y.

Repeating in this way, each growth process is the same as above, and will not be described again. When the growth is stopped in all directions, the checkerboard sequence contains multiple checkerboards.

It should be noted that, the calibration image obtained in S101 corresponds to multiple checkerboard targets. In an ideal state, the checkerboards generated in S103 are consistent with the multiple checkerboard targets. Alternatively, some deviations occur during the growth process, and even if there are such deviations, the checkerboards generated in S103 have a corresponding relationship with the multiple checkerboard targets, and multiple checkerboards are also generated in S103.

S104: converting each of the multiple checkerboards to a respective checkerboard world coordinate system to obtain second checkerboard corners of each checkerboard.

The checkerboard world coordinate system referred to a coordinate system of the world in which the checkerboard is located, which is different from a capturer world coordinate system in the subsequent content.

Specifically, for each of the generated checkerboards, an origin of a coordinate system may be selected in the checkerboard, wherein the origin of the coordinate system and a plane in which the checkerboard is located constitute a checkerboard world coordinate system of this checkerboard. Taking the coordinate system as a reference, coordinates of a second checkerboard corner corresponding to each of the first checkerboard corners in the checkerboard are calculated.

In this embodiment, for each checkerboard, a corresponding checkerboard world coordinate system is established.

There are various ways to select an origin of a checkerboard world coordinate system. For example, any of the corners of the generated checkerboard may be selected randomly as the origin of the coordinate system. Alternatively the corners in the checkerboard can be detected and the first corner detected is taken as the origin of the coordinate system, and so on, which is not specifically limited herein.

The plane where the checkerboard is located is taken as the XY plane of the checkerboard world coordinate system, and a ray emitted from the origin of the coordinate system and perpendicular to the XY plane is the Z axis, thus the checkerboard world coordinate system is established. Based on the origin of the coordinate system, coordinates of the first checkerboard corners in the checkerboard except for the origin of the coordinate system in the checkerboard world coordinate system are calculated. Obtaining the coordinates through calculation is equivalent to converting the checkerboard to the checkerboard world coordinate system. For convenience of description, the checkerboard corners in the checkerboard world coordinate system are referred to as the second checkerboard corners. In other words, the first checkerboard corners are the pixels in the calibration image, and the second checkerboard corners are the checkerboard corners in the checkerboard world coordinate system.

S105: calculating the parameters of the camera to be calibrated according to a projection relationship between the second checkerboard corners and the first checkerboard corners.

Those skilled in the art will understand that parameters of a camera generally include a camera internal parameter, a camera external parameter, and a distortion parameter. These parameters can be optimally solved by using the LM (Levenberg-Marquardt) algorithm.

As an implementation, S105 may include:
initializing the camera internal parameter, the camera external parameter and the distortion parameter;
optimally solving the initialized camera internal parameter, the camera external parameter and the distortion parameter using a first objective function;
the first objective function is:

$$rms = \Sigma_{i=1}^{n} \Sigma_{j=1}^{m_i} \|m_{ij} - \breve{m}(A, D, R_i, T_i, M_j)\|^2,$$

wherein rms is a re-projection error, the object of the first objective function is to minimize the re-projection error, n is the number of the checkerboards, $m_i$ is the number of corners in an i-th checkerboard, $m_{ij}$ represent a j-th first checkerboard corner in the i-th checkerboard, $M_{ij}$ represents a j-th second checkerboard corner in the i-th checkerboard, A represents the camera internal parameter, D represents the distortion parameter, and $R_i$ represents a rotation parameter in the camera external parameter between an i-th checkerboard world coordinate system and a capturer world coordinate system, $T_i$ represents a translation parameter in the camera external parameter between the i-th checkerboard world coordinate system and the capturer world coordinate system, $\breve{m}(A, D, R_i, T_i, M_{ij})$ represents a projection point obtained after the second checkerboard corner $M_{ij}$ is transformed through the A, D, $R_i$, and $T_i$, and the projection point can be understood as the coordinates of the pixel projected in the image plane.

First parameter initialization is performed.

For the camera internal parameter, the camera internal parameter generally includes a principal point and a focal length. The closed-loop equation in the Zhang's calibration method can be used to solve the initial principal point and the initial focal length. Alternatively, the method in the Opencv (Open Source Computer Vision Library) can be used, the image center is taken as the initial principal point and the initial focal length is calculated by extracting a vanishing point. Alternatively, the initial principal point and the initial focal length can be directly given, or the like, which is not specifically limited herein.

For the distortion parameter, it can be initialized to 0, or the type and initial value of the distortion parameter can be determined according to actual situations.

For the camera external parameter, the initial value of the camera external parameter can be solved by using the initial value of the camera internal parameter and the initial value of the distortion parameter via solvePnP function.

Then, using the first objective function described above, the initial values of the above three parameters are optimally solved to obtain the final parameters of the camera. The object of the first objective function is to minimize the re-projection error rms, which is the error between the first checkerboard corner $m_{ij}$ and the projection point of the corresponding second checkerboard corner $M_j$, wherein the projection point of the second checkerboard corner $M_j$ is the point $\breve{m}(A, D, R_i, T_i, M_j)$ obtained after the second checkerboard corner $M_j$ is transformed through the camera internal parameter A, the distortion parameter D, and the camera external parameter Ri and Ti.

When applying the embodiment shown in FIG. 1 of the present application, the camera performs image capturing on multiple checkerboard targets to obtain a calibration image, in other words, the calibration image contains multiple checkerboards, and the camera parameters are solved based on the calibration image containing the multiple checkerboards. In a first aspect, the calibration image contains multiple checkerboards, so that it is not necessary to adjust the position or posture of a checkerboard target for multiple times and to capture a calibration image with respect to the checkerboard target for multiple times, thereby improving the calibration efficiency. In a second aspect, the fact of capturing a calibration image with respect to the checkerboard target for multiple times results in a relatively large error for capturing, while this error for capturing is reduced by applying this solution.

In the embodiment shown in FIG. 1, the camera parameters are mainly solved based on the obtained calibration image. If parameter calibration is performed on a monocular camera, the final parameters of the camera are obtained according to the embodiment of FIG. 1. If parameter calibration is performed on a binocular camera (two capturers) or a multi-ocular camera (more than two capturers), the camera parameters are obtained for one capturer according to the embodiment of FIG. 1.

Figure 6:
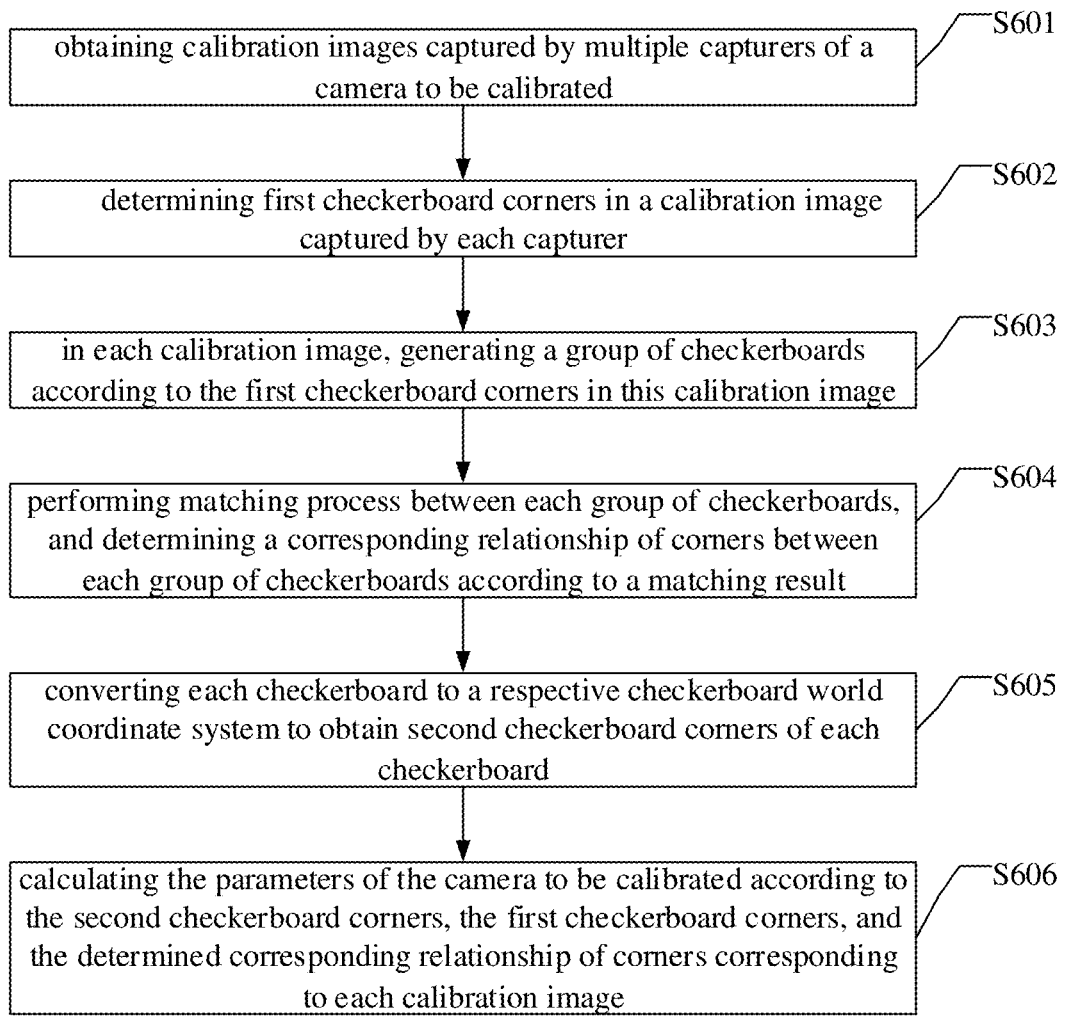
FIG. 6 is a schematic flowchart of a second method for calibrating parameters of a camera according to an embodiment of the present disclosure.

The present application further provides an embodiment shown in FIG. 6 to solve camera parameters based on the calibration images captured by multiple capturers. The embodiment shown in FIG. 6 is mainly applied to a binocular camera or a multi-ocular camera. In the embodiment shown in FIG. 6, the camera to be calibrated contains multiple capturers, each of which captures images for a same group of checkerboard targets, and the same group of checkerboard targets includes multiple checkerboard targets, and the obtained calibration images contains calibration images captured by the multiple capturers.

FIG. 6 is a schematic flowchart of a second method for calibrating parameters of a camera provided by an embodiment of the present disclosure, including:

S601: obtaining calibration images captured by multiple capturers of a camera to be calibrated.

According to the above description, multiple checkerboard targets are preset, and the postures and positions of the multiple checkerboard targets are different. Optionally, for each of the multiple checkerboard targets, the angle between a plane in which the checkerboard target is located and a corresponding imaging plane may be between 30 degrees and 45 degrees, and the planes in which the respective checkerboard targets are located are not parallel to each other.

If the camera is a binocular camera, two calibration images are captured. Ideally, the multiple checkerboards contained in the two calibration images (the checkerboard in the real world is called a checkerboard target, and the checkerboard in the image is called a checkerboard) are consistent, or some deviations occur during the capturing process. Even if there are such deviations, the multiple checkerboards contained in the two calibration images have a corresponding relationship.

If the camera is a multi-ocular camera, each of the capturers captures a calibration image and thus multiple calibration images are obtained. Similarly, there is a corresponding relationship among the multiple checkerboards contained in the multiple calibration images.

S602: determining first checkerboard corners in a calibration image captured by each capturer.

S603: in each calibration image, generating a group of checkerboards according to the first checkerboard corners in this calibration image.

The group of checkerboards includes multiple checkerboards. The group of checkerboards corresponds to the above preset multiple checkerboard targets.

S604: performing matching process between each group of checkerboards, and determining a corresponding relationship of corners between each group of checkerboards according to a matching result.

In the embodiment shown in FIG. 6, the camera includes multiple capturers, and the corresponding relationship between the checkerboards in the calibration images captured by different capturers needs to be determined. It can be understood that each calibration image contains a group of checkerboards. For a certain checkerboard in a calibration image, a corresponding checkerboard needs to be found in other images, and in addition a corresponding relationship of the corners between two checkerboards needs to be determined.

As an implementation, S604 may include:

for every two groups of checkerboards, selecting two pairs of checkerboards each time from a first group of checkerboards and a second group of checkerboards; wherein each pair of checkerboards includes a first checkerboard and a second checkerboard, the first checkerboard is a checkerboard in the first group of checkerboards, the second checkerboard is a checkerboard in the second group of checkerboards;

calculating a transformation relationship between the first group of checkerboards and the second group of checkerboards according to a similarity variation matrix by using two pairs of checkerboards selected each time;

according to the transformation relationship, projecting a center point of each checkerboard of the first group of checkerboards to the second group of checkerboards to obtain multiple projection points;

determining, for each projection point, a target center point having the smallest distance from the projection point among center points of all the checkerboards of the second group of checkerboards;

determining, according to each projection point and its corresponding target center point, a matching combination corresponding to this selection, wherein the matching combination includes a one-to-one corresponding relationship between each of the first group of checkerboards and each of the second group of checkerboards;

determining a target matching combination with the highest matching degree from matching combinations corresponding to all selections;

determining a corresponding relationship of corners between the checkerboards in the target matching combination.

The determination of the corresponding relationship of corners between each group of checkerboards can be achieved in pairs. Take two groups of checkerboards, i.e. group P and group Q as an example (group P is a first group and group Q is a second group). Each time two checkerboards are selected from group P, and two checkerboards are selected from group Q, a checkerboard from group P and a checkerboard from group Q form a pair of checkerboards, so that two pairs of checkerboards are selected. Assuming that group P and group Q both contain 9 checkerboards, the exhaustive method can be used to select two pairs of checkerboards each time, that is, $C^2_9$ selections can be made.

Taking a pair of checkerboards under one selection as an example, it is assumed that this pair of checkerboards includes Checkerboard 1 in group P and Checkerboard 2 in group Q. The center point $P_1$ of Checkerboard 1 and the center point $P_2$ of Checkerboard 2 are determined, and a center point can also be understood as a mean point. Specifically, the transformation relationship $H_S$ between group P and group Q can be calculated by using the similarity variation matrix $P_2=H_S P_1$.

The center points of the nine checkerboards in group P are projected onto group Q according to the $H_S$ to obtain nine projection points. For each projection point, a target center point having the smallest distance from the projection point is determined from the center points of the checkerboards in group Q. In this way, nine pairs of points are determined, each pair of points includes a projection point and a target center point, a corresponding relationship exists between the checkerboard corresponding to the projection point (the checkerboard in group P) and the checkerboard where the target center point is located (the checkerboard in group Q). In other words, there is a corresponding relationship of the nine pairs of checkerboards. The corresponding relationship of the nine pairs of checkerboards constitutes a matching combination. In other words, based on each selection, a matching combination can be determined, and based on $C^2_9$ selections, $C^2_9$ matching combinations can be determined. Among the $C^2_9$ matching combinations, the target matching combination with the highest matching degree is determined.

Specifically, for a matching combination corresponding to each selection, an affine variation coefficient corresponding to the matching combination is calculated. The corners in the first group of checkerboards are projected to the second group of checkerboards according to the affine variation coefficient, to obtain projection corners. For each pair of checkerboards under the matching combination, the pair of checkerboards are rotated, and after each rotation, corner distances between the projection corners and the corners in the second group of checkerboards in the pair of checkerboards are calculated. The minimum corner distance of the pair of checkerboards is determined. A center point offset distance of each pair of checkerboards is calculated. A matching score is calculated for each matching combination according to the minimum corner distance and the center point offset distance; a matching combination with the highest matching score is determined as the target matching combination.

Taking a matching combination as an example, the affine variation coefficient between group P of checkerboards and group Q of checkerboards is calculated. Specifically, the center point (mean point) $P_A$ of group P and the center point (mean point) $P_B$ of group Q can be determined. According to $P_B = AP_A$, the affine variation coefficient A is calculated. $P_A$ may include center points of multiple checkerboards in group P, and $P_B$ may include center points of multiple checkerboards in group Q.

Each corner in group P is projected into group Q according to the affine variation coefficient A, and the projection corners are obtained.

For each pair of checkerboards under the matching combination, the pair of checkerboards are rotated, and multiple rotations can be performed. After each rotation, the corner distances between the projection corners and the corners in group Q are calculated. Specifically, the corner distance can be calculated by using $$distance_p = \frac{\Sigma_{p \in C} \|P_L - P_{LR}\|}{n},$$

wherein $distance_p$ represents the corner distance, n represents the number of corners, and $P_L$ is the corner in the second group of checkerboards, $P_{LR}$ is the point at which the corner of the first group of checkerboards is projected onto the second group of checkerboards, and C is all the corners of the checkerboards. The minimum corner distance of the pair of checkerboards is determined.

The center point offset distance of each pair of checkerboards is determined. The center point offset distance mainly considers the overall offset distance of the checkerboards. Specifically, the offset distance can be calculated by using $distance_C = C_P - C_{P'}$, where $distance_C$ represents the offset distance, and $C_P$ represents the center point of the first group of checkerboards, $C_{P'}$ represents the projection corner obtained by projecting $C_P$ onto the second group of checkerboards.

According to the minimum corner distance and the center point offset distance of each pair of checkerboards, the matching score of each matching combination is calculated. Specifically, $$Score = \sum_{i=1}^{n} \left(2 - \frac{distance_p}{n_1} - \frac{distance_c}{n_2}\right)$$

can be used to calculate the matching score, Score represents the matching score, $distance_p$ represents the above corner distance, $distance_C$ represents the above offset distance, n is the number of checkerboards (9 in the above example), and $n_1$ and $n_2$ may be a given spacing value, for example, $n_1$ may be set to 0.2 times the maximum spacing in the second group of checkerboards, and $n_2$ is the maximum spacing in the second group of checkerboards, or may be set to other values, which are not specifically limited herein.

The combination with the highest matching score is used as the target matching combination, and the corresponding relationship of corners between the checkerboards in the target matching combination is determined. It can also be understood that, assuming there is a point in the space, the point is projected onto the first group of checkerboards and thus point 1 is obtained, and then the point is projected onto the second group of checkerboards and thus point 2 is obtained. The corresponding relationship between point 1 and point 2 is determined, in other words, the corresponding relationship of corners between the checkerboards in the target matching combination is determined. According to the corresponding relationship of corners, the rotational and translation relationship between the calibration images captured by the capturers can be further determined.

It can be understood that if the camera to be calibrated is a binocular camera, the first group of checkerboards is a checkerboard group in a calibration image captured by one of the capturers, and the second group of checkerboards is a checkerboard group in a calibration image captured by the other capturer. Applying the above embodiment, the corresponding relationship of corners between the calibration images captured by the two capturers is determined.

If the camera to be calibrated is a multi-ocular camera, the above embodiment is applied to determine the corresponding relationship of corners between the calibration images captured by every two capturers, so that it can also determine the corresponding relationship of corners between each capturer of the multi-ocular camera.

S605: converting each checkerboard to a respective checkerboard world coordinate system to obtain second checkerboard corners of each checkerboard.

S606: calculating the parameters of the camera to be calibrated according to the second checkerboard corners, the first checkerboard corners, and the determined corresponding relationship of corners corresponding to each calibration image.

Those skilled in the art can understand that the parameters of the binocular camera and the multi-ocular camera are generally include a camera internal parameter, a camera external parameter, a distortion parameter, and a rotational translation parameter between each capturer. These parameters can be optimally solved by using the LM algorithm.

As an implementation, S605 may include:

Initializing the camera internal parameter, the camera external parameter and the distortion parameter;

determining, according to the corresponding relationship of corners, an initial value of a rotational relationship and an initial value of a translational relationship between a capturer world coordinate system corresponding to each of the checkerboards; optimally solving the camera internal parameter, the camera external parameter, the distortion parameter, and the rotational relationship and the translational relationship between each capturer world coordinate system by using a second objective function;

$$rms = \sum_{k=1}^{q} \sum_{l=k}^{k+1} \left\{ \sum_{i=1}^{n_{kl}} \sum_{j=1}^{m_i} \|m_{lij} = \check{m}(A_l, D_l, R_{ki}, T_{ki}, R_{kl}, T_{kl}, M_{ij})\|^2 \right\}$$

wherein rms is a re-projection error, an object of the second objective function is to minimize the re-projection error, $m_i$ is the number of corners in the i-th checkerboard, k and l both represent a capturer identifier, and q represents the number of capturers contained in the camera to be calibrated, and $n_{kl}$ represents the number of common checkerboard targets between the capturer identified as l and the capturer identified as k, and $m_{lij}$ represents the j-th first checkerboard corner in the i-th checkerboard in the calibration image captured by the capturer identified as l, $M_{ij}$ represents the j-th second checkerboard corner in the i-th checkerboard, and $A_l$ represents the camera internal parameter of the capturer identified as l, and $D_l$ represents the distortion parameter of the capturer identified as l, $R_{ki}$ represents the rotation parameter between the checkerboard world coordinate system of the i-th checkerboard in the calibration image captured by the capturer identified as k and the capturer world coordinate system, and $T_{ki}$ represents the translation parameter between the checkerboard world coordinate system of the i-th checkerboard in the calibration image captured by the capturer identified as k and the capturer world coordinate system, and $R_{kl}$ represents the rotational relationship between the world coordinate system of the capturer identified as l and the world coordinate system of the capturer identified as k, $T_{kl}$ represents the translational relationship between the world coordinate system of the capturer identified as l and the world coordinate system of the capturer identified as k, wherein the camera external parameter of the capturer identified as k includes: $R_{ki}$, $T_{ki}$; $\check{m}(A_l, D_l, R_{ki}, T_{ki}, R_{kl}, T_{kl}, M_{ij})$ represents a projection point obtained after the second checkerboard corner $M_{ij}$ is transformed through $A_l$, $D_l$, $R_{ki}$, $T_{ki}$, $R_{kl}$ and $T_{kl}$, which can be understood as the coordinates of the pixel projected in the image plane.

First parameter initialization is performed.

For the camera internal parameter, the camera internal parameter generally includes a principal point and a focal length; the closed-loop equation in the Zhang's calibration method can be used to solve the initial principal point and the initial focal length. Alternatively, the Opencv (Open Source Computer Vision Library) can be used, the image center is taken as the initial principal point and the initial focal length is calculated by extracting a vanishing point. Alternatively, the initial principal point and the initial focal length can be directly given, or the like, which is not specifically limited herein.

For the distortion parameter, it can be initialized to 0, or the type and initial value of the distortion parameter can be determined according to actual situations.

For the camera external parameter, the initial value of the camera external parameter can be solved by using the first checkerboard corners and the second checkerboard corners via solvePnP function. That is to solve the rotational relationship and translational relationship between a checkerboard world coordinate system and a camera coordinate system by using a corner of a certain checkerboard in space and its corresponding corner in the calibration image.

The rotational and translation relationship between the capturers can be determined by using the above rotational and translation relationship between a checkerboard world coordinate system and the world coordinate systems of respective capturers. In the case of a binocular camera, for a point in a certain checkerboard in space, the corresponding point in the checkerboard world coordinate system is P, assuming that its projection point in one of the capturer world coordinate systems is $P_x$, its projection point in another capturer world coordinate system is $P_y$, $P_y = R_y R^{-1}_x P_x + T_y - R_y R^{-1}_x T_x = RP_x + T$ can be derived by using $P_x = R_x P + T_x$, $P_y = R_y P + T_y$, wherein R represents the rotational relationship between the capturer world coordinate systems, T represents the translational relationship between the capturer world coordinate systems, and $R_x$, $T_x$ represents the rotational and translation parameters between the checkerboard world coordinate system and one capturer world coordinate system; $R_y$, $T_y$ represent the rotational and translation parameters between the checkerboard world coordinate system and another capturer world coordinate system. Here $R_x$, $T_x$ and $R_y$, $T_y$ are calculated by the above solvePnP method.

It can be understood that for each pair of checkerboards in the calibration images captured by two capturers, a rotational and translation relationship can be determined, and a median value can be taken for these rotational and translation relationships, and the median value is used as the initial value of the rotational and translation relationship of the two capturers.

Then, using the second objective function described above, the initial values of the above several parameters are optimally solved to obtain the final camera parameters. The object of the second objective function is to minimize the re-projection error rms, which is the error between the first checkerboard corner $m_{lij}$ and the projection point of its corresponding second checkerboard corner $M_j$, the projection point of the second checkerboard corner $M_j$ is a projection point obtained after the second checkerboard corner $M_{ij}$ is transformed through the camera internal parameter $A_l$, the distortion parameter $D_l$, and the camera external parameter $R_{ki}$ and $T_{ki}$, the rotational and translation relationship $R_{kl}$ and $T_{kl}$, the projection point can be understood as the coordinates of the pixel projected in the image plane.

With the second objective function described above, the parameters of the multi-ocular camera can be solved, and the parameters of the binocular camera can also be solved. Next, a specific objective function is given for a binocular camera. For convenience of description, the two capturers of the binocular camera are divided into a left capturer and a right capturer. The target function for the binocular camera may specifically be:

$$rms = \sum_{i=1}^{n} \sum_{j=1}^{m_i} \left( \left\| m_{Lij} - \check{m}(A_L, D_L, R_{Li}, T_{Li}, M_{ij}) \right\|^2 + \left\| m_{Rij} - \check{m}(A_R, D_R, R_{Li}, T_{Li}, R, T, M_{ij}) \right\|^2 \right)$$

wherein n is the number of the checkerboards, $m_i$ is the number of corners in the i-th checkerboard, and $m_{Lij}$ represents the j-th first checkerboard corner in the i-th checkerboard in the calibration image collected by the left capturer, $M_{ij}$ represents the j-th second checkerboard corner in the i-th checkerboard, $A_L$ represents the camera internal parameter of the left capturer, $D_L$ represents the distortion parameter of the left capturer, and $R_{Li}$ represents the rotation parameter between the checkerboard coordinate system of the i-th checkerboard and the world coordinate system of the left capturer, $T_{Li}$ represents the translational parameter between the checkerboard coordinate system of the i-th checkerboard and the world coordinate system of the left capturer, and $m_{Rij}$ represents the j-th first checkerboard corner of the i-th checkerboard in the calibration image collected by the right capturer, $A_R$ represents the camera internal parameter of the right capturer, $D_R$ represents the distortion parameter of the right capturer, R represents the rotational relationship between the left and right capturer world coordinate systems, and T represents the translational relationship between the left and right capturer world coordinate systems, $\check{m}(A_L, D_L, R_{Li}, T_{Li}, M_{ij})$ represents the projection point in the camera image plane of the left capturer obtained after the second checkerboard corner $M_{ij}$ is transformed through the camera internal parameter $A_L$, the distortion parameter $D_L$, and the camera external parameter $R_{Li}$ and $T_{Li}$, $\check{m}(A_R, D_R, R_{Li}, T_{Li}, R, T, M_{ij})$ represents the projection point in the camera image plane of the right capturer obtained after the second checkerboard corner $M_{ij}$ is transformed through the camera internal parameter $A_R$, the distortion parameter $D_R$, and the camera external parameter $R_{Ri}$ and $T_{Ri}$, the rotational relationship R between the left and right capturers, the translational relationship T between the left and right capturers.

When applying the embodiment shown in FIG. 6 of the present application, a binocular camera or a multi-ocular camera performs image capturing on multiple checkerboard targets to obtain multiple calibration images, each of which contains multiple checkerboards. Based on the calibration images containing the multiple checkerboards, the camera parameters are solved, and it does not need to adjust the position or posture of a checkerboard target for multiple times, and does not need to capture an image of the checkerboard target for multiple times, thereby improving the calibration efficiency.

As an implementation, after S605, a verification image captured by each capturer of the camera to be calibrated may be obtained, wherein the verification image is captured by the capturer with respect to the same group of checkerboard targets.

Each verification image is corrected according to the calculated camera parameters by using a preset correction algorithm.

Feature points in each of the corrected verification images are determined, and a feature point group is formed by feature points having a corresponding relationship in different verification images.

A correction error of the feature points in each feature point group is calculated.

Whether the correction error satisfies a sixth preset condition is determined.

If yes, the calculated parameters are determined as final camera parameters.

If not, the multiple checkerboard targets are adjusted and S801 is performed.

In this implementation, after obtaining the camera parameters, the camera parameters are verified. If the camera parameters pass the verification, the camera parameters are used as the final camera parameters. If the camera parameters do not pass the verification, the positions/postures of the multiple checkerboard targets are adjusted, re-calibration is performed, that is, the embodiment of FIG. 6 is performed again.

Take a binocular camera as an example. The binocular camera captures a group of binocular images (assumed to be a left image and a right image) as verification images. The binocular images are corrected according to the camera parameters calculated in the above solution and using the preset correction algorithm. Then, the feature points are respectively determined in the corrected binocular images, and the feature points in the left image are matched with the feature points in the right image, and the matched feature points constitute a feature point group.

As an implementation, the feature points contained in each feature point group may belong to different verification images respectively. For example, it is determined that feature point 1 in the left image and feature point 2 in the right image are matched feature points, and feature points 1 and 2 constitute a feature point group.

Alternatively, the feature points contained in each feature point group may also belong to a same verification image. For example, it is determined that feature point 1 in the left image and feature point 2 in the right image are matched feature points, and feature point 3 in the left image and feature point 4 in the right image are matched feature points, and feature point 1, feature point 2, feature point 3, and feature point 4 constitute a feature point group.

In order to improve the accuracy of the verification, multiple feature points can be selected in each image, and these feature points are evenly distributed in the image. After determining multiple feature point groups, the correction error of the feature points in each feature point group is calculated.

For example, the preset correction algorithm may be a Bouguet MCT algorithm, and the correction error may include two aspects, one is a vertical direction error, and the other is a horizontal direction error. Those skilled in the art can understand that the parallax and depth difference of an image are related to the error in the horizontal direction. If the error in the horizontal direction is verified and meets the requirements, the parallax and depth difference of the image can be considered to meet the requirements.

The error in the vertical direction can be calculated by using $$E_{align} = \frac{\Sigma_{p \in P} |p_{1y} - p_{2y}|}{n},$$

wherein $E_{align}$ represents the error in the vertical direction, and $p_{1y}$ represents the vertical coordinate of the pixel p in one of the calibration images, $p_{2y}$ represents the vertical coordinate of the pixel p in the other calibration image, n is the number of feature point groups, and P is all the feature point groups.

A corresponding threshold can be set for $E_{align}$, such as 0.5 pix (pixel units).

The error in the horizontal direction is calculated. For each feature point group, the parallax d can be calculated according to the differences of the horizontal coordinates of all feature points in the group. The three-dimensional coordinates of each pixel in the calibration image in the world coordinate system are calculated according to the calculated camera parameters. The distance among each pixel is calculated according to the three-dimensional coordinates, the calculated distance is compared with the actual distance in the real world, and the error in the horizontal direction is determined according to the comparison result.

If the projection errors of the two aspects are respectively smaller than their corresponding thresholds, the verification is successful, the calculated camera parameters are effective, and the calculated parameters are determined as the final camera parameters.

Figure 7:
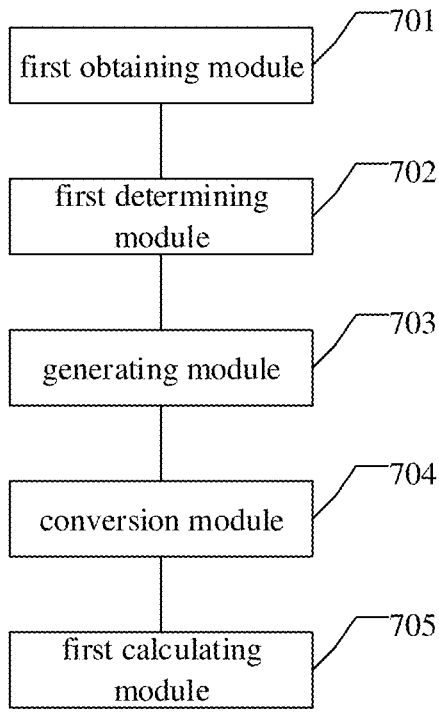
FIG. 7 is a schematic structural diagram of an apparatus for calibrating parameters of a camera according to an embodiment of the present disclosure.

Corresponding to the foregoing method embodiment, an embodiment of the present application further provide an apparatus for calibrating parameters of a camera, as shown in FIG. 7, including:

a first obtaining module 701, configured to obtain a calibration image for multiple checkerboard targets captured by a camera to be calibrated;

a first determining module 702, configured to determine, in the calibration image, first checkerboard corners;

a generating module 703, configured to generate multiple checkerboards according to the determined first checkerboard corners;

a conversion module 704, configured to convert each of the multiple checkerboards to a respective checkerboard world coordinate system to obtain second checkerboard corners of each checkerboard;

a first calculating module 705, configured to calculate the parameters of the camera to be calibrated according to a projection relationship between the second checkerboard corners and the first checkerboard corners.

As an implementation, the first determining module 702 includes:

a filtering sub-module, configured to filter the calibration image by using a preset image filtering template;

a calculating sub-module, configured to calculate a corner likelihood of each pixel in the calibration image according to a filtering result;

a determining sub-module, configured to determine the first checkerboard corners in the calibration image based on a corner likelihood of each pixel.

As an implementation, the filtering sub-module is specifically configured to:

filter the calibration image by using at least one type of preset image filtering template to obtain at least one group of filtered images, wherein each type of image filtering template includes multiple image filtering templates, each type of image filtering template corresponds to a group of filtered images, and each type of image filtering template is set with respect to a feature of checkerboard corners.

The calculating sub-module is specifically configured to:

calculate a mean image of each group of filtered images;

calculate difference information between each group of filtered images and its mean image;

calculate, according to the difference information, a corner likelihood of each pixel in the calibration image;

As an implementation, the determining sub-module includes:

a first determining unit, configured to determine candidate pixels in the calibration image based on the corner likelihood of each pixel;

a first calculating unit, configured to calculate, for each candidate pixel, a gradient score and/or a brightness score of the candidate pixel; wherein the gradient score indicates the similarity between the gray variation direction of the candidate pixel and the gray variation direction of a checkerboard corner; and the brightness score indicates the similarity between the gray value of the candidate pixel and the gray value of a checkerboard corner;

a first selecting unit, configured to selecting the first checkerboard corners from the candidate pixels based on the gradient scores and/or the brightness scores.

As an implementation, the determining sub-module may further include:

an optimization unit, configured to determining two directions with largest gradient magnitudes in a neighborhood of the candidate pixel as edge directions of the candidate pixel; and optimize the edge directions and position of the candidate pixel.

The first calculating unit is specifically configured to calculate a gradient score and/or a brightness score of each optimized candidate pixel; wherein the gradient score indicates the similarity between the gray variation direction of the candidate pixel and the gray variation direction of a checkerboard corner; and the brightness score indicates the similarity between the gray value of the candidate pixel and the gray value of a checkerboard corner.

As an implementation, the generating module 703 includes:

a second determining unit, configured to successively determine a current corner from each of the first checkerboard corners;

a third determining unit, configured to determine, for each current corner, a first preset number of adjacent points of the current corner, wherein the first preset number of adjacent points belong to the first checkerboard corners;

a second calculating unit, configured to calculate energy of an initial unit formed by the current corner and the first preset number of adjacent points by using an energy minimization function;

a first judging unit, configured to determine whether the energy of the initial unit is less than a preset threshold; if not, trigger the second determining unit; if yes, trigger a continuing growing unit;

the continuing growing unit, configured to perform checkerboard growth based on the initial unit, and obtain a checkerboard corresponding to the current corner.

It can be understood that in an optional apparatus embodiment, a module includes a sub-module, a sub-module includes a unit, the "continuing growing unit" is a unit under a sub-module, and the unit in the initial unit and the growth unit is a checkerboard unit, which have different meanings.

As an implementation, the continuing growing unit may be specifically configured to:

for each of four growth directions of the initial unit, determine a candidate corner in this direction;

determine a second preset number of adjacent points of the candidate corner, the second preset number of adjacent points belong to the first checkerboard corners;

calculate energy of a growth unit formed by the candidate corner and the second preset number of adjacent points;

select a growth unit having the least energy as a growth result;

determine whether the energy of the growth result is greater than the energy of the initial unit;

if yes, stop the growth in this direction;

if not, continue the growth based on the growth result.

As an implementation, the generating module 703 may further include:

a second judging unit, configured to determine whether a checkerboard sequence is empty; if yes, trigger an adding unit, and if not, trigger a third judging unit;

an adding a unit, configured to add the checkerboard corresponding to the current corner to the checkerboard sequence;

a third judging unit, configured to determine whether there is an overlapping corner between the checkerboard corresponding to the current corner and a checkerboard in the checkerboard sequence; if not, trigger the adding unit, and if yes, trigger a fourth judging unit;

a fourth judging unit, configured to determine whether the energy of the checkerboard corresponding to the current corner is less than the energy of a target checkerboard; if yes, trigger a replacing unit;

a replacing unit, configured to replace the target checkerboard with the checkerboard corresponding to the current corner in the checkerboard sequence.

As an implementation, the camera to be calibrated contains multiple capturers, each of which captures images for a same group of checkerboard targets, wherein the same group of checkerboard targets includes multiple checkerboard targets, and the calibration image includes calibration images captured by the multiple capturers.

The first determining module 702 is specifically configured to:

determine first checkerboard corners in a calibration image captured by each capturer;

the generating module is specifically configured to:

in each calibration image, generate a group of checkerboards according to the first checkerboard corners in this calibration image, and the group of checkerboards includes multiple checkerboards.

The apparatus may further include:

a matching module, configured to perform matching process between each group of checkerboards, and determine a corresponding relationship of corners between each group of checkerboards according to a matching result.

The first calculating module 705 is specifically configured to:

calculate the parameters of the camera to be calibrated according to the second checkerboard corners, the first checkerboard corners, and the determined corresponding relationship of corners corresponding to each calibration image.

As an implementation, the matching module includes:

a second selecting unit, configured to select, with respect to every two groups of checkerboards, two pairs of checkerboards each time from a first group of checkerboards and a second group of checkerboards; wherein each pair of checkerboards includes a first checkerboard and a second checkerboard, the first checkerboard is a checkerboard in the first group of checkerboards, and the second checkerboard is a checkerboard in the second group of checkerboards;

a third calculating unit, configured to calculate a transformation relationship between the first group of checkerboards and the second group of checkerboards according to a similarity variation matrix by using two pairs of checkerboards selected each time;

a projection unit, configured to project a center point of each checkerboard of the first group of checkerboards to the second group of checkerboards according to the transformation relationship, to obtain multiple projection points;

a fourth determining unit, configured to determine, for each projection point, a target center point having the smallest distance from the projection point among center points of all the checkerboards of the second group of checkerboards;

a fifth determining unit, configured to determine, according to each projection point and its corresponding target center point, a matching combination corresponding to this selection, wherein the matching combination includes a one-to-one corresponding relationship between each of the first group of checkerboards and each of the second group of checkerboards;

a sixth determining unit, configured to determine a target matching combination with the highest matching degree from matching combinations corresponding to selections;

a seventh determining unit, configured to determine a corresponding relationship of corners between the checkerboards in the target matching combination.

As an implementation, the sixth determining unit is specifically configured to:

for a matching combination corresponding to each selection, calculate an affine variation coefficient corresponding to the matching combination;

project the corners in the first group of checkerboards to the second group of checkerboards according to the affine variation coefficient, to obtain projection corners;

for each pair of checkerboards under the matching combination, rotate the pair of checkerboards, and after each rotation, calculate corner distances between the projection corners and the corners in the second group of checkerboards in the pair of checkerboards; determine the minimum corner distance of the pair of checkerboards;

determine a center point offset distance of each pair of checkerboards;

calculate a matching score for each matching combination according to the minimum corner distance and the center point offset distance of each pair of checkerboards;

use a matching combination with the highest matching score as the target matching combination.

As an implementation, the conversion module 704 can be specifically configured to:

for each generated checkerboard, select an origin of a coordinate system in the checkerboard, wherein the origin of the coordinate system and a plane in which the checkerboard is located constitute a checkerboard world coordinate system of this checkerboard;

calculate coordinates of a second checkerboard corner corresponding to each of the first checkerboard corners in the checkerboard, taking the origin of the coordinate system as a reference.

As an implementation, the parameters include a camera internal parameter, a camera external parameter, and a distortion parameter; the first calculating module 705 can be specifically configured to:

initialize the camera internal parameter, the camera external parameter and the distortion parameter;

optimally solve the initialized camera internal parameter, the camera external parameter and the distortion parameter using a first objective function;

the first objective function is:

$$\text{rms} = \Sigma_{i=1}^{n} \Sigma_{j=1}^{m_i} \|m_{ij} - \dot{m}(A,D,R_i,T_i,M_j)\|^2,$$

wherein rms is a re-projection error, the object of the first objective function is to minimize the re-projection error, n is the number of the checkerboards, $m_i$ is the number of corners in the i-th checkerboard, $m_{ij}$ represent the j-th first checkerboard corner in the i-th checkerboard, $M_{ij}$ represents the j-th second checkerboard corner in the i-th checkerboard, A represents the camera internal parameter, D represents the distortion parameter, and $R_i$ represents a rotation parameter in the camera external parameter between an i-th checkerboard world coordinate system and a capturer world coordinate system, $T_i$ represents a translation parameter in the camera external parameter between the i-th checkerboard world coordinate system and the capturer world coordinate system, $\dot{m}(A, D, R_i, M_{ij})$ represents a projection point obtained after the second checkerboard corner $M_{ij}$ is transformed through A, D, $R_i$, and $T_i$.

As an implementation, the parameters include a camera internal parameter, a camera external parameter, a distortion parameter, and rotational and translation parameters between each of the capturers; the first calculating module 705 may be specifically configured to:

initialize the camera internal parameter, the camera external parameter and the distortion parameter;

determine, according to the corresponding relationship of corners, an initial value of a rotational relationship and an initial value of a translational relationship between a capturer world coordinate system corresponding to each of the checkerboards;

optimally solve the camera internal parameter, the camera external parameter, the distortion parameter, and the rotational relationship and the translational relationship between each capturer world coordinate system by using a second objective function;

the second objective function is:

$$\text{rms} = \Sigma_{k=1}^{q} \Sigma_{l=k}^{k+1} \{ \Sigma_{i=1}^{n_{kl}} \Sigma_{j=1}^{m_i} \|m_{lij} - \dot{m}(A_l, D_l, R_{kl}, T_{kl}, R_{kl}, T_{kl}, M_{ij})\|^2 \}$$

wherein rms is a re-projection error, an object of the second objective function is to minimize the re-projection error, $m_i$ is the number of corners in the i-th checkerboard, k and l both represent a capturer identifier, and q represents the number of capturers contained in the camera to be calibrated, and $n_{kl}$ represents the number of common checkerboard targets between the capturer identified as l and the capturer identified as k, and $m_{lij}$ represents the j-th first checkerboard corner in the i-th checkerboard in the calibration image captured by the capturer identified as l, $M_{ij}$ represents the j-th second checkerboard corner in the i-th checkerboard, and $A_l$ represents the camera internal parameter of the capturer identified as l, and $D_l$ represents the distortion parameter of the capturer identified as l, $R_{ki}$ represents the rotation parameter between the checkerboard world coordinate system of the i-th checkerboard in the calibration image captured by the capturer identified as k and the capturer world coordinate system, and $T_{ki}$ represents the translation parameter between the checkerboard world coordinate system of the i-th checkerboard in the calibration image captured by the capturer identified as k and the capturer world coordinate system, and $R_{kl}$ represents the rotational relationship between the world coordinate system of the capturer identified as l and the world coordinate system of the capturer identified as k, $T_{kl}$ represents the translational relationship between the world coordinate system of the capturer identified as l and the world coordinate system of the capturer identified as k, wherein the camera external parameter of the capturer identified as k includes: $R_{ki}$, $T_{ki}$; $\tilde{m}(A_l, D_l, R_{ki}, T_{ki}, R_{kl}, T_{kl}, M_{ij})$ represents a projection point obtained after the second checkerboard corner $M_{ij}$ is transformed through $A_l$, $D_l$, $R_{ki}$, $T_{ki}$, $R_{kl}$ and $T_{kl}$.

As an implementation, the apparatus may further include:

a second obtaining module, configured to obtain a verification image captured by each capturer of the camera to be calibrated, wherein the verification image is captured by the capturer with respect to the same group of checkerboard targets;

a correction module, configured to correct each verification image according to the calculated camera parameters by using a preset correction algorithm;

a second determining module, configured to determine feature points in each of the corrected verification images, and form a feature point group by feature points having a corresponding relationship in different verification images;

a second calculating module, configured to calculate a correction error of the feature points in each feature point group;

a judging module, configured to determine whether the calculated camera parameters are effective; if yes, determine the calculated camera parameters as final camera parameters; if not, trigger an adjusting module;

the adjusting module, configured to adjust the multiple checkerboard targets and trigger the first obtaining module.

Figure 8:
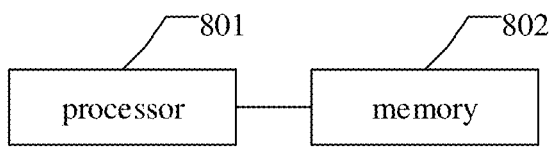
FIG. 8 is a schematic structural diagram of an electronic device according to an embodiment of the present disclosure.

An embodiment of the present application further provides an electronic device, as shown in FIG. 8, including a processor 801 and a memory 802, wherein the memory 802 is configured to store a computer program;

the processor 801 is configured to implement the method for calibrating parameters of a camera provided by the embodiments of the present application when executing the program stored in the memory 802.

When applying the embodiment shown in FIG. 8 of the present application, the camera performs image capturing on multiple checkerboard targets to obtain a calibration image, in other words, the calibration image contains multiple checkerboards, and the camera parameters are solved based on the calibration image containing the multiple checkerboards. In a first aspect, the calibration image contains multiple checkerboards, so that it is not necessary to adjust the position or posture of a checkerboard target for multiple times and to capture a calibration image with respect to the checkerboard target for multiple times, thereby improving the calibration efficiency. In a second aspect, the fact of capturing a calibration image with respect to the checkerboard target for multiple times results in a relatively large error for capturing, while this error for capturing is reduced by applying this solution.

An embodiment of the present application further provides a computer readable storage medium, wherein the computer readable storage medium stores a computer program, and the computer program implements the method for calibrating parameters of a camera provided by the embodiments of the present application when being executed by a processor.

Figure 9:
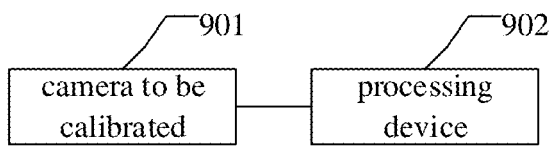
FIG. 9 is a schematic structural diagram of a first system for calibrating a camera according to an embodiment of the present application.

Corresponding to the foregoing method embodiment, an embodiment of the present application further provides a system for calibrating a camera, as shown in FIG. 9, including: a camera to be calibrated 901 and a processing device 902; wherein, the camera to be calibrated 901 is to be configured to performing image capturing on multiple checkerboard targets to obtain a calibration image;

the processing device 902 is configured to obtain the calibration image for multiple checkerboard targets captured by the camera to be calibrated; determine, in the calibration image, first checkerboard corners; generate multiple checkerboards according to the determined first checkerboard corners; convert each of the multiple checkerboards to a respective checkerboard world coordinate system to obtain second checkerboard corners of each checkerboard; calculate the parameters of the camera to be calibrated according to a projection relationship between the second checkerboard corners and the first checkerboard corners.

Figure 10:
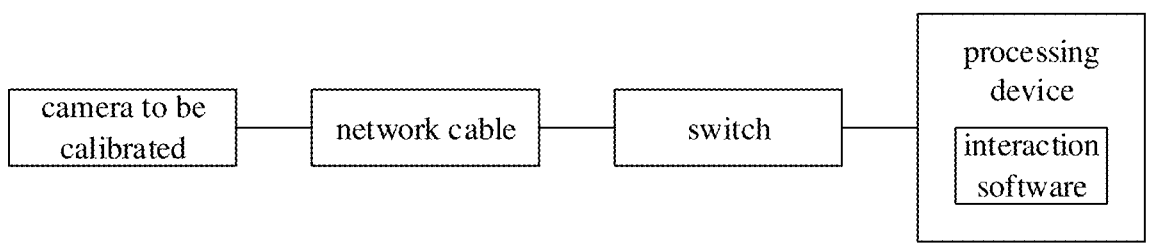
FIG. 10 is a schematic structural diagram of a second system for calibrating a camera according to an embodiment of the present application.

As an implementation, as shown in FIG. 10, the camera to be calibrated and the processing device can be connected through a device such as a network cable, a switch, and the like, and the processing device can also be provided with an interaction software and display the images captured by the camera to be calibrated via the interaction software, or perform other data interaction via the interaction software, which is not specifically limited herein.

Alternatively, the camera to be calibrated and the processing device can be directly connected through a USB interface or the interface of the camera itself, without passing through the switch and the network cable, which is also appropriate. The embodiments of the present application do not limit the connection manner between the camera to be calibrated and the processing device.

An embodiment of the present application also provides executable program code, which implement any of the above methods for calibrating parameters of a camera when being executed.

Applying the embodiments of the present application, the camera performs image capturing on multiple checkerboard targets to obtain a calibration image, in other words, the calibration image contains multiple checkerboards, and the camera parameters are solved based on the calibration image containing the multiple checkerboards. In a first aspect, the calibration image contains multiple checkerboards, so that it is not necessary to adjust the position or posture of a checkerboard target for multiple times and capture a calibration image with respect to the checkerboard target for multiple times, thereby improving the calibration efficiency. In a second aspect, the fact of capturing a calibration image with respect to the checkerboard target for multiple times results in a relatively large error for capturing, while this error for capturing is reduced by applying this solution.

It should be noted that, in the specification, relationship terms such as "first," "second" and the like are only used to distinguish one entity or operation from another entity or operation, and do not necessarily require or imply that there is any such actual relationship or order between those entities or operations. Moreover, the terms "include," "contain" or any other variants are intended to cover a non-exclusive inclusion, such that processes, methods, objects or devices including a series of elements include not only those elements, but also other elements not specified or the elements inherent to those processes, methods, objects, or devices. Without further limitations, an element limited by the phrase "include(s) a . . . " do not exclude that there are other identical elements in the processes, methods, objects, or devices that include that element.

The various embodiments in the present specification are described in a related manner, same or similar parts among the various embodiments may be referred to each other, and each embodiment focuses on the differences from the other embodiments. In particular, for the embodiments of an apparatus for calibrating parameters of a camera shown in FIG. 7, the embodiment of an electronic device shown in FIG. 8, the above embodiment of a computer readable storage medium and above embodiment of executable program codes, and the embodiment of system for calibrating a camera shown in FIGS. 9-10, since they are basically similar to the embodiments of a method for calibrating parameters of a camera shown in FIGS. 1-6, the descriptions are relatively simple, and the relevant parts can be referred to the description of the method embodiments.

The above description is only the preferred embodiments of the present application, and is not intended to limit the protection scope of the present application. Any modifications, equivalent substitutions, improvements, and the like made within the spirit and principles of the present application fall within the protection scope of the present application.

The invention claimed is:

1. A method for calibrating parameters of a camera, comprising:
   obtaining a calibration image for multiple checkerboard targets captured by a camera to be calibrated;
   determining, in the calibration image, first checkerboard corners;
   generating multiple checkerboards according to the determined first checkerboard corners;
   converting each of the multiple checkerboards to a respective checkerboard world coordinate system to obtain second checkerboard corners of each checkerboard;
   calculating the parameters of the camera to be calibrated according to a projection relationship between the second checkerboard corners and the first checkerboard corners;
   wherein, determining, in the calibration image, first checkerboard corners comprises:
   filtering the calibration image by using a preset image filtering template; calculating a corner likelihood of each pixel in the calibration image according to a filtering result determining the first checkerboard corners in the calibration image based on a corner likelihood of each pixel;
   wherein calculating a corner likelihood of each pixel in the calibration image according to a filtering result comprises: calculating a mean image of each group of filtered images; calculating difference information between each group of filtered images and its mean image; calculating, according to the difference information, a corner likelihood of each pixel in the calibration image.

2. The method according to claim 1, wherein, filtering the calibration image by using a preset image filtering template comprises:
   filtering the calibration image by using at least one type of preset image filtering template to obtain at least one group of filtered images, wherein each type of image filtering template comprises multiple image filtering templates, each type of image filtering template corresponds to a group of filtered images, and each type of image filtering template is set with respect to a feature of checkerboard corners.

3. The method according to claim 1, wherein, determining the first checkerboard corners in the calibration image based on a corner likelihood of each pixel comprises:
   determining candidate pixels in the calibration image based on a corner likelihood of each pixel;
   calculating, for each candidate pixel, a gradient score and/or a brightness score of the candidate pixel; wherein the gradient score indicates a similarity between a gray variation direction of the candidate pixel and a gray variation direction of a checkerboard corner; and the brightness score indicates a similarity between a gray value of the candidate pixel and a gray value of a checkerboard corner;
   selecting the first checkerboard corners from the candidate pixels based on the gradient scores and/or the brightness scores.

4. The method according to claim 3, wherein, before calculating the gradient score and/or the brightness score of the candidate pixel, the method further comprises:
   determining two directions with largest gradient magnitudes in a neighborhood of the candidate pixel as edge directions of the candidate pixel;
   optimizing the edge directions and position of the candidate pixel;
   wherein calculating a gradient score and/or a brightness score of the candidate pixel comprises:
   calculating a gradient score and/or a brightness score of the optimized candidate pixel.

5. The method according to claim 1, wherein generating checkerboards according to the determined first checkerboard corners comprises:
   successively determining a current corner from each of the first checkerboard corners;
   determining, for each current corner, a first preset number of adjacent points of the current corner, wherein the first preset number of adjacent points belong to the first checkerboard corners;
   calculating energy of an initial unit formed by the current corner and the first preset number of adjacent points by using an energy minimization function;
   determining whether the energy of the initial unit is less than a preset threshold;
   if not, returning to the step of successively determining a current corner from each of the first checkerboard corners;
   if yes, performing checkerboard growth based on the initial unit, and obtaining a checkerboard corresponding to the current corner.

6. The method according to claim 5, wherein performing checkerboard growth based on the initial unit and obtaining a checkerboard corresponding to the current corner comprises:
- for each of four growth directions of the initial unit, determining a candidate corner in this direction;
- determining a second preset number of adjacent points of the candidate corner, the second preset number of adjacent points belong to the first checkerboard corners;
- calculating energy of a growth unit formed by the candidate corner and the second preset number of adjacent points;
- selecting a growth unit having the least energy as a growth result;
- determining whether the energy of the growth result is greater than the energy of the initial unit;
- if yes, stopping the growth in this direction;
- if not, continuing the growth based on the growth result.

7. The method according to claim 5, wherein after performing checkerboard growth based on the initial unit and obtaining a checkerboard corresponding to the current corner, the method further comprises:
- determining whether a checkerboard sequence is empty;
- if it is determined that the checkerboard sequence is empty, adding the checkerboard corresponding to the current corner to the checkerboard sequence;
- if it is determined that the checkerboard sequence is not empty, determining whether there is an overlapping corner between the checkerboard corresponding to the current corner and a checkerboard in the checkerboard sequence;
- if it is determined that there is no overlapping corner between the checkerboard corresponding to the current corner and a checkerboard in the checkerboard sequence, adding the checkerboard corresponding to the current corner to the checkerboard sequence;
- if it is determined that there is an overlapping corner between the checkerboard corresponding to the current corner and a checkerboard in the checkerboard sequence, determining a target checkerboard in the checkerboard sequence where the overlapping corner is located;
- determining whether the energy of the checkerboard corresponding to the current corner is less than the energy of the target checkerboard;
- if it is determined that the energy of the checkerboard corresponding to the current corner is less than the energy of the target checkerboard, replacing the target checkerboard with the checkerboard corresponding to the current corner in the checkerboard sequence.

8. The method according to claim 1, wherein, the camera to be calibrated comprises multiple capturers, each of the capturers perform image capturing for a same group of checkerboard targets, and the same group of checkerboard targets comprises multiple checkerboard targets, and the calibration image comprises calibration images captured by the multiple capturers;
- wherein determining first checkerboards corners in the calibration image comprises:
  - determining first checkerboard corners in a calibration image captured by each capturer;
  - wherein generating multiple checkerboards according to the determined first checkerboard corners comprises:
  - in each calibration image, generating a group of checkerboards according to the first checkerboard corners in this calibration image, the group of checkerboards comprises multiple checkerboards;
- before converting each of the multiple checkerboards to a respective checkerboard world coordinate system to obtain second checkerboard corners of each checkerboard, the method further comprises:
- performing matching process between each group of checkerboards, and determining a corresponding relationship of corners between each group of checkerboards according to a matching result;
- wherein calculating the parameters of the camera to be calibrated according to a projection relationship between the second checkerboard corners and the first checkerboard corners comprises:
- calculating the parameters of the camera to be calibrated according to the second checkerboard corners, the first checkerboard corners, and the determined corresponding relationship of corners corresponding to each calibration image.

9. The method according to claim 8, wherein, performing matching process between each group of checkerboards, and determining a corresponding relationship of corners between each group of checkerboards according to a matching result comprises:
- for every two groups of checkerboards, selecting two pairs of checkerboards each time from a first group of checkerboards and a second group of checkerboards; wherein each pair of checkerboards comprises a first checkerboard and a second checkerboard, the first checkerboard is a checkerboard in the first group of checkerboards, the second checkerboard is a checkerboard in the second group of checkerboards;
- calculating a transformation relationship between the first group of checkerboards and the second group of checkerboards according to a similarity variation matrix by using two pairs of checkerboards selected each time;
- according to the transformation relationship, projecting a center point of each checkerboard of the first group of checkerboards to the second group of checkerboards to obtain multiple projection points;
- determining, for each projection point, a target center point having the smallest distance from the projection point among center points of all the checkerboards of the second group of checkerboards;
- determining, according to each projection point and its corresponding target center point, a matching combination corresponding to this selection, wherein the matching combination comprises a one-to-one corresponding relationship between each of the first group of checkerboards and each of the second group of checkerboards;
- determining a target matching combination with the highest matching degree from matching combinations corresponding to all selections;
- determining a corresponding relationship of corners between the checkerboards in the target matching combination.

10. The method according to claim 9, wherein determining a target matching combination with the highest matching degree from matching combinations corresponding to all selections comprises:
- for a matching combination corresponding to each selection, calculating an affine variation coefficient corresponding to the matching combination;
- projecting the corners in the first group of checkerboards to the second group of checkerboards according to the affine variation coefficient, to obtain projection corners;

for each pair of checkerboards under the matching combination, rotating the pair of checkerboards, and after each rotation, calculating corner distances between the projection corners and the corners in the second group of checkerboards in the pair of checkerboards;

determining the minimum corner distance of the pair of checkerboards;

determining a center point offset distance of each pair of checkerboards;

calculating a matching score for each matching combination according to the minimum corner distance and the center point offset distance of each pair of checkerboards;

using a matching combination with the highest matching score as the target matching combination.

11. The method according to claim 8, wherein the parameters comprise a camera internal parameter, a camera external parameter, a distortion parameter, and rotational and translation parameters between each of the capturers; wherein calculating the parameters of the camera to be calibrated according to the second checkerboard corners, the first checkerboard corners, and the determined corresponding relationship of corners corresponding to each calibration image comprises:

initializing the camera internal parameter, the camera external parameter and the distortion parameter;

determining, according to the corresponding relationship of corners, an initial value of a rotational relationship and an initial value of a translational relationship between a capturer world coordinate system corresponding to each of the checkerboards;

optimally solving the camera internal parameter, the camera external parameter, the distortion parameter, and the rotational relationship and the translational relationship between each capturer world coordinate system by using a second objective function;

the second objective function is:

$$\text{rms}=\Sigma_{k=1}^{q}\Sigma_{l=k}^{k+1}\{\Sigma_{i=1}^{n_{kl}}\Sigma_{j=1}^{m_{ij}}\|m_{lij}=\hat{m}(A_l,D_l,R_{ki},T_{ki},R_{kl},T_{kl},M_{ij})\|^2\}$$

wherein rms is a re-projection error, an object of the second objective function is to minimize the re-projection error, $m_i$ is the number of corners in an i-th checkerboard, k and l both represent a capturer identifier, and q represents the number of capturers comprised in the camera to be calibrated, and $n_{kl}$ represents the number of common checkerboard targets between a capturer identified as l and a capturer identified as k, and $m_{lij}$ represents a j-th first checkerboard corner in an i-th checkerboard in a calibration image captured by the capturer identified as l, $M_{ij}$ represents a j-th second checkerboard corner in the i-th checkerboard, and $A_l$ represents the camera internal parameter of the capturer identified as l, and $D_l$ represents the distortion parameter of the capturer identified as l, $R_{ki}$ represents the rotation parameter between the checkerboard world coordinate system of the i-th checkerboard in a calibration image captured by the capturer identified as k and the capturer world coordinate system, and $T_{ki}$ represents the translation parameter between the checkerboard world coordinate system of the i-th checkerboard in the calibration image captured by the capturer identified as k and the capturer world coordinate system, and $R_{kl}$ represents the rotational relationship between the world coordinate system of the capturer identified as l and the world coordinate system of the capturer identified as k, $T_{kl}$ represents the translational relationship between the world coordinate system of the capturer identified as 1 and the world coordinate system of the capturer identified as k, wherein the camera external parameter of the capturer identified as k comprises: $R_{ki}$, $T_{ki}$; $\hat{m}(A_l, D_l, R_{ki}, T_{ki}, R_{kl}, T_{kl}, M_{ij})$ represents a projection point obtained after the second checkerboard corner $M_{ij}$ is transformed through $A_l$, $D_l$, $R_{ki}$, $T_{ki}$, $R_{kl}$ and $T_{kl}$.

12. The method according to claim 8, wherein after calculating the parameters of the camera to be calibrated according to the second checkerboard corners, the first checkerboard corners, and the determined corresponding relationship of corners corresponding to each calibration image, the method further comprises:

obtaining a verification image captured by each capturer of the camera to be calibrated, wherein the verification image is captured by the capturer with respect to the same group of checkerboard targets;

correcting each verification image according to the calculated parameters of the camera by using a preset correction algorithm;

determining feature points in each of the corrected verification images, and forming a feature point group by feature points having a corresponding relationship in different verification images;

calculating a correction error of the feature points in each feature point group;

determining whether the calculated parameters of the camera are effective based on the correction error;

if yes, determining the calculated parameters as final parameters of the camera;

if not, adjusting the multiple checkerboard targets and returning to the step of obtaining a calibration image for multiple checkerboard targets captured by the camera to be calibrated.

13. The method according to claim 1, wherein converting each of the multiple checkerboards to a respective checkerboard world coordinate system to obtain second checkerboard corners of each checkerboard comprises:

for each of the generated checkerboards, selecting an origin of a coordinate system in the checkerboard, wherein the origin of the coordinate system and a plane in which the checkerboard is located constitute a checkerboard world coordinate system of this checkerboard;

calculating coordinates of a second checkerboard corner corresponding to each of the first checkerboard corners in the checkerboard, taking the origin of the coordinate system as a reference.

14. The method according to claim 1, wherein the parameters comprises a camera internal parameter, a camera external parameter and a distortion parameter; wherein calculating the parameters of the camera to be calibrated according to a projection relationship between the second checkerboard corners and the first checkerboard corners comprises:

initializing the camera internal parameter, the camera external parameter and the distortion parameter;

optimally solving the initialized camera internal parameter, the camera external parameter and the distortion parameter using a first objective function;

the first objective function is:

$$\text{rms}=\Sigma_{i=1}^{n}\Sigma_{j=1}^{m_i}\|m_{ij}=\hat{m}(A,D,R_i,T_i,M_j)\|^2,$$

wherein rms is a re-projection error, an object of the first objective function is to minimize the re-projection error, n is the number of the checkerboards, $m_i$ is the number of corners in an i-th checkerboard, $m_{ij}$ represent a j-th first checkerboard corner in the i-th checkerboard, $M_{ij}$ represents a j-th second checkerboard corner in the i-th checkerboard, A represents the camera internal parameter, D represents the distortion parameter, $R_i$, represents a rotation parameter in the camera external parameter between an i-th checkerboard world coordinate system and a capturer world coordinate system, $T_i$ represents a translation parameter in the camera external parameter between the i-th checkerboard world coordinate system and the capturer world coordinate system, $\tilde{m}(A, D, R_i, T_i, M_{ij})$ represents a projection point obtained after the second checkerboard corner $M_u$ is transformed through A, D, $R_i$, and $T_i$.

15. An electronic device, comprising a processor and a memory, wherein
    the memory is configured to store a computer program;
    the processor is configured to implement the method according to claim 1 when executing the program stored in the memory.

16. A non-transitory computer readable storage medium, wherein the computer readable storage medium stores a computer program, and the computer program implements the method according to claim 1 when being executed by a processor.

17. A system for calibrating a camera, comprising: a camera to be calibrated and a processing device; wherein,
    the camera to be calibrated is configured to perform image capturing on multiple checkerboard targets to obtain a calibration image;
    the processing device is configured to obtain the calibration image for the multiple checkerboard targets captured by the camera to be calibrated; determine, in the calibration image, first checkerboard corners; generate multiple checkerboards according to the determined first checkerboard corners; convert each of the multiple checkerboards to a respective checkerboard world coordinate system to obtain second checkerboard corners of each checkerboard; calculate the parameters of the camera to be calibrated according to a projection relationship between the second checkerboard corners and the first checkerboard corners;
    wherein, determining, in the calibration image, first checkerboard corners comprises: filtering the calibration image by using a preset image filtering template; calculating a corner likelihood of each pixel in the calibration image according to a filtering result determining the first checkerboard corners in the calibration image based on a corner likelihood of each pixel;
    wherein calculating a corner likelihood of each pixel in the calibration image according to a filtering result comprises: calculating a mean image of each group of filtered images; calculating difference information between each group of filtered images and its mean image; calculating, according to the difference information, a corner likelihood of each pixel in the calibration image.

* * * * *

UNITED STATES PATENT AND TRADEMARK OFFICE
CERTIFICATE OF CORRECTION

PATENT NO. : 11,158,089 B2
APPLICATION NO. : 16/627621
DATED : October 26, 2021
INVENTOR(S) : Zhang et al.

Page 1 of 2

It is certified that error appears in the above-identified patent and that said Letters Patent is hereby corrected as shown below:

In the Specification

In Description, on Column 6, Line 19 should read as follows:
-- includes $I_{c_1}^i$ --

In Description, on Column 6, Lines 22-25 should read as follows:
$$I_{c_1}^i = \min\{\min(f_A^i, f_B^i) - I_{uf}, I_{uf} - \min(f_C^i, f_D^i)\}$$
$$I_{c_2}^i = \min\{I_{uf} - \min(f_A^i, f_B^i), \min(f_C^i, f_D^i) - I_{uf}\}$$

In Description, on Column 16, Lines 57-62 should read as follows:
$$rms = \sum_{k=1}^{q} \sum_{l=k}^{k+1} \left\{ \sum_{i=1}^{n_{kl}} \sum_{j=1}^{m_i} \|m_{lij} - \tilde{m}(A_l, D_l, R_{ki}, T_{ki}, R_{kl}, T_{kl}, M_{ij})\|^2 \right\}$$

In Description, on Column 25, Line 30 should read as follows:
-- $\tilde{m}(A_l, D_l, R_{ki}, T_{ki}, R_{kl}, T_{kl}, M_{ij})$ --

In the Claims

In Claim 11, on Column 31, Lines 38-40 should read as follows:
$$rms = \sum_{k=1}^{q} \sum_{l=k}^{k+1} \left\{ \sum_{i=1}^{n_{kl}} \sum_{j=1}^{m_i} \|m_{lij} - \tilde{m}(A_l, D_l, R_{ki}, T_{ki}, R_{kl}, T_{kl}, M_{ij})\|^2 \right\}$$

In Claim 14, on Column 32, Line 63 should read as follows:
$$rms = \sum_{i=1}^{n} \sum_{j=1}^{m_i} \|m_{ij} - \tilde{m}(A, D, R_i, T_i, M_j)\|^2$$

Signed and Sealed this
Twenty-fourth Day of May, 2022

Katherine Kelly Vidal
*Director of the United States Patent and Trademark Office*

In Claim 14, on Column 33, Line 12 should read as follows:
-- after the second checkerboard corner $M_{ij}$ --